(12) United States Patent
Akashi et al.

(10) Patent No.: US 7,432,019 B2
(45) Date of Patent: Oct. 7, 2008

(54) SOLID ELECTROLYTE BATTERY

(75) Inventors: Hiroyuki Akashi, Kanagawa (JP);
Gorou Shibamoto, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/940,739

(22) Filed: Sep. 14, 2004

(65) Prior Publication Data

US 2005/0031937 A1 Feb. 10, 2005

Related U.S. Application Data

(62) Division of application No. 09/575,237, filed on May 22, 2000, now Pat. No. 7,183,021.

(30) Foreign Application Priority Data

May 26, 1999 (JP) ............................... P11-146653
Dec. 22, 1999 (JP) ............................... P11-365064

(51) Int. Cl.
*H01M 10/40* (2006.01)
(52) U.S. Cl. .................... 429/303; 429/309; 429/144
(58) Field of Classification Search ................ 429/306, 429/303, 300, 144; 252/62.2
See application file for complete search history.

(56) References Cited

U.S. PATENT DOCUMENTS

| | | | | |
|---|---|---|---|---|
| 5,460,904 | A | * | 10/1995 | Gozdz et al. ................. 429/316 |
| 5,641,565 | A | * | 6/1997 | Sogo ....................... 428/315.7 |
| 5,688,293 | A | | 11/1997 | Oliver et al. |
| 5,716,421 | A | | 2/1998 | Pendalwar et al. |
| 5,853,916 | A | | 12/1998 | Venugopal et al. |
| 6,322,923 | B1 | | 11/2001 | Spotnitz et al. |
| 6,447,955 | B1 | * | 9/2002 | Takahashi et al. ......... 429/231.8 |
| 2002/0136945 | A1 | * | 9/2002 | Call et al. .................. 429/144 |

FOREIGN PATENT DOCUMENTS

| | | | |
|---|---|---|---|
| EP | 0 682 376 | * | 11/1995 |
| EP | 0803925 A | | 10/1997 |
| EP | 0933824 A | | 8/1999 |
| EP | 0994521 A | | 4/2000 |

(Continued)

OTHER PUBLICATIONS http://www.celgard.net/products/fsmproperties.cfm, no date.

*Primary Examiner*—John S Maples
(74) *Attorney, Agent, or Firm*—Sonnenschein Nath & Rosenthal LLP

(57) ABSTRACT

A solid electrolyte battery having improved energy density and safety, the solid electrolyte battery incorporating a positive electrode; a negative electrode disposed opposite to the positive electrode; a separator disposed between the positive electrode and the negative electrode; and solid electrolytes each of which is disposed between the positive electrode and the separator and between the separator and the negative electrode, wherein the separator is constituted by a polyolefin porous film, the polyolefin porous film has a thickness satisfying a range not greater than 5 μm nor greater than 15 μm and a volume porosity satisfying a range not less than 25% nor greater than 60%, and the impedance in the solid electrolyte battery is greater than the impedance realized at the room temperature when the temperature of the solid electrolyte battery satisfies a range not less than 100° C. nor greater than 160° C.

14 Claims, 17 Drawing Sheets

FOREIGN PATENT DOCUMENTS

| | | |
|---|---|---|
| JP | 9-241411 | 9/1997 |
| JP | 10-50292 | 2/1998 |
| JP | 11-260341 | 9/1999 |
| JP | 11-269290 | 10/1999 |
| JP | 2000-7819 | 1/2000 |
| WO | WO 9828812 A | 7/1998 |

* cited by examiner

SOLID ELECTROLYTE BATTERY

CROSS REFERENCE TO RELATED APPLICATIONS

The present application is a divisional of and claims priority to U.S. application Ser. No. 09/575,237, filed May 22, 2000, now U.S. Pat. No. 7,183,021,and also claims priority to Japanese Application No. P11-146653,filed May 26, 1999, and Japanese Application No. P11-365064, filed Dec. 22, 1999, which applications are incorporated herein by reference to the extent permitted by law.

BACKGROUND OF THE INVENTION

The present invention relates to a solid electrolyte battery incorporating a solid electrolyte, and more particularly to a solid electrolyte battery incorporating a separator which has specific mechanical strength and thermal characteristics so as to considerably improve its energy density and safety.

As a power source for a portable electronic apparatus, such as a portable telephone or a notebook personal computer, a battery is an important element. To reduce the size and weight of the electronic apparatus, increase in the capacity of the battery and reduction in the volume of the same have been required. From the foregoing viewpoints, a lithium battery exhibiting a high energy density and output density is suitable to serve as the power source of the portable electronic apparatus. A lithium battery incorporating a negative electrode made of a carbon material has a mean discharge voltage of 3.7 V or greater. Moreover, deterioration caused from charge and discharge cycles can relatively satisfactorily be prevented. Therefore, the lithium battery has an advantage that a high energy density can easily be realized.

Lithium batteries are required to permit a variety of shapes to be formed. The batteries have the flexibility and high degree of freedom of their shape to form a sheet battery having a small thickness and a large area and a card battery having a small thickness and a small area. A conventional structure, in which battery elements—a positive electrode, a negative electrode, and an electrolytic solution—are enclosed in a metal can, encounters difficulties in forming the variety of shapes. Since the electrolytic solution is employed, the manufacturing process becomes too complicated. Moreover, a countermeasure against leakage of the solution must be taken.

To solve the above-mentioned problems, batteries have been researched and developed which incorporate a solid electrolyte composed of either a conductive organic polymer or inorganic ceramic solid electrolyte or a gel-like solid electrolyte (hereinafter called a "gel electrolyte") in which matrix polymers are impregnated with electrolytic solution. In both types of solid electrolyte batteries the electrolyte is fixed. Therefore, contact between the electrode and the electrolyte can be maintained. Hence it follows that the foregoing batteries are free from the necessity of having to enclose the electrolytic solution by employing a metal can or by exerting pressure on the battery element. A film-shape case material can be used to reduce the thickness of the battery. Thus, an energy density greater than that of a conventional battery can be realized.

In general, the solid electrolyte of the solid electrolyte battery has proper mechanical strength as disclosed in "MATERIAL TECHNIQUE OF HIGH-PERFORMANCE SECONDARY BATTERY AND EVALUATION, APPLICATION AND DEVELOPMENT OF THE SAME" (Technical Information Association, 1998). Therefore, a structure of the battery, distinct from that of the conventional battery incorporating the electrolytic solution, can be selected. For example, it has been reported that a separator is not required between the positive electrode and the negative electrode. This provides a known advantage for the solid electrolyte.

The reported solid electrolyte suffers from unsatisfactory strength, including piercing resistance, as compared with the conventional separator constituted by a polyolefin porous film and the like. When the thickness of the solid electrolyte of the conventional solid electrolyte battery is reduced to, for example, 40 µm or greater to raise the energy density, there arises a problem in that internal short circuiting frequently occurs after the battery has been assembled. As described above, the energy density of the solid electrolyte battery cannot easily be raised by reducing the thickness of the solid electrolyte layer.

As for heat resistance, which is an index to evaluate the reliability of the battery, the conventional solid electrolyte battery suffers from unsatisfactory heat resistance. A portion of the batteries on the market are designed to use a so-called "shutdown effect" to improve heat resistance. However, a solid electrolyte material for the solid electrolyte battery having the shutdown effect has not been found.

As for the reliability and safety of the battery, the reliability and safety cannot easily be realized as the energy density of the battery is raised. Therefore, a technique for maintaining the safety of the solid electrolyte battery also must be considered when a solid electrolyte battery is designed to raise the energy density.

A thin battery incorporates a separator which is made of polyolefin. In particular, a polyethylene separator is employed.

In a usual state, when the temperature of the battery has melted down and, therefore, short circuiting occurs between the positive electrode and the negative electrode, thermorunaway does not occur. In a case where a battery is used in an abnormal environment, for example, in a case where the temperature of a battery has been raised because the battery has been charged to a voltage level greater than a usual level, there is apprehension that an accident can occur. In the foregoing case, there is apprehension that use of a separator made of polyethylene, which has a melting point less than that of polypropylene, might cause a melt-down of the separator to take place. That is, breakage of the separator might occur, causing a short circuit between the positive electrode and the negative electrode to take place. Thus, there is apprehension that the battery will generate heat.

BRIEF SUMMARY OF THE INVENTION

In view of the foregoing, an object of the present invention is to provide a solid electrolyte battery having a high energy density and improved safety.

To achieve the object, according to one aspect of the invention, there is provided a solid electrolyte battery including: a positive electrode; a negative electrode disposed opposite to the positive electrode; a separator disposed between the positive electrode and the negative electrode; and solid electrolytes each of which is disposed between the positive electrode and the separator and between the separator and the negative electrode, wherein the separator is constituted by a polyolefin porous film, the polyolefin porous film having a thickness of not less than 5 µm nor greater than 15 µm and a volume volume porosity not less than 25% nor greater than 60%, and the impedance in the solid electrolyte battery is greater at a temperature not less than 100° C. nor greater than 160° C. than the impedance at room temperature.

The solid electrolyte battery according to the present invention incorporates the separator constituted by the polyolefin porous film having the specified thickness, volume volume porosity and thermal characteristic. Thus, the energy density can be raised and the safety of the same can be improved.

According to another aspect of the present invention, there is provided a solid electrolyte battery including: a positive electrode; a negative electrode disposed opposite to the positive electrode; a separator disposed between the positive electrode and the negative electrode; and solid electrolytes each of which is disposed between the positive electrode and the separator and between the separator and the negative electrode, wherein the separator is constituted by a polyolefin porous film, the polyolefin porous film has thickness not less than 5 µm nor greater than 15 µm, a volume volume porosity not less than 25% nor greater than 60%, a breaking strength less than 1650 kg/cm$^2$ and a breaking ductility not less than 135%.

The solid electrolyte battery according to the present invention incorporates the separator constituted by the polyolefin porous film having the specified thickness, volume volume porosity and thermal characteristic. Thus, the energy density can be raised and the safety of the same can be improved.

According to another aspect of the present invention, there is provided a solid electrolyte battery including: a positive electrode; a negative electrode disposed opposite to the positive electrode; a separator disposed between the positive electrode and the negative electrode; and solid electrolytes each of which is disposed between the positive electrode and the separator and between the separator and the negative electrode, wherein the separator is constituted by a composite material of polyethylene and polypropylene, the polyolefin porous film has a thickness not less than 5 µm nor greater than 15 µm, the shutdown temperature is substantially the same as the shutdown temperature of a separator constituted by polyethylene, and the meltdown temperature is greater than the meltdown temperature of a separator constituted by polypropylene by not less than 10° C. nor greater than 30° C.

The solid electrolyte battery according to the present invention incorporates the separator constituted by a composite material of polyethylene and polypropylene. Thus, the energy density can be raised and the safety of the same can be improved.

According to another aspect of the present invention, there is provided a solid electrolyte battery including: a positive electrode; a negative electrode disposed opposite to the positive electrode; a separator disposed between the positive electrode and the negative electrode; and solid electrolytes each of which is disposed between the positive electrode and the separator and between the separator and the negative electrode, wherein the separator is formed by bonding a first separator constituted by polyethylene and a second separator constituted by polypropylene to each other, the separator has a thickness not less than 5 µm nor greater than 15 µm, and the separator has a shutdown temperature which is substantially the same as the shutdown temperature of a separator constituted by polyethylene, and a meltdown temperature which is substantially the same as the meltdown temperature of a separator constituted by polypropylene.

The solid electrolyte battery according to the present invention incorporates the separator formed by bonding the first separator constituted by polyethylene and a second separator constituted by polypropylene to each other. Thus, the energy density can be raised and the safety of the same can be improved.

Other objects, features and advantages of the invention will be evident from the following detailed description of the preferred embodiments described in conjunction with the attached drawings.

DETAILED DESCRIPTION OF THE INVENTION

Embodiments of the present invention will now be described.

Figure 1:
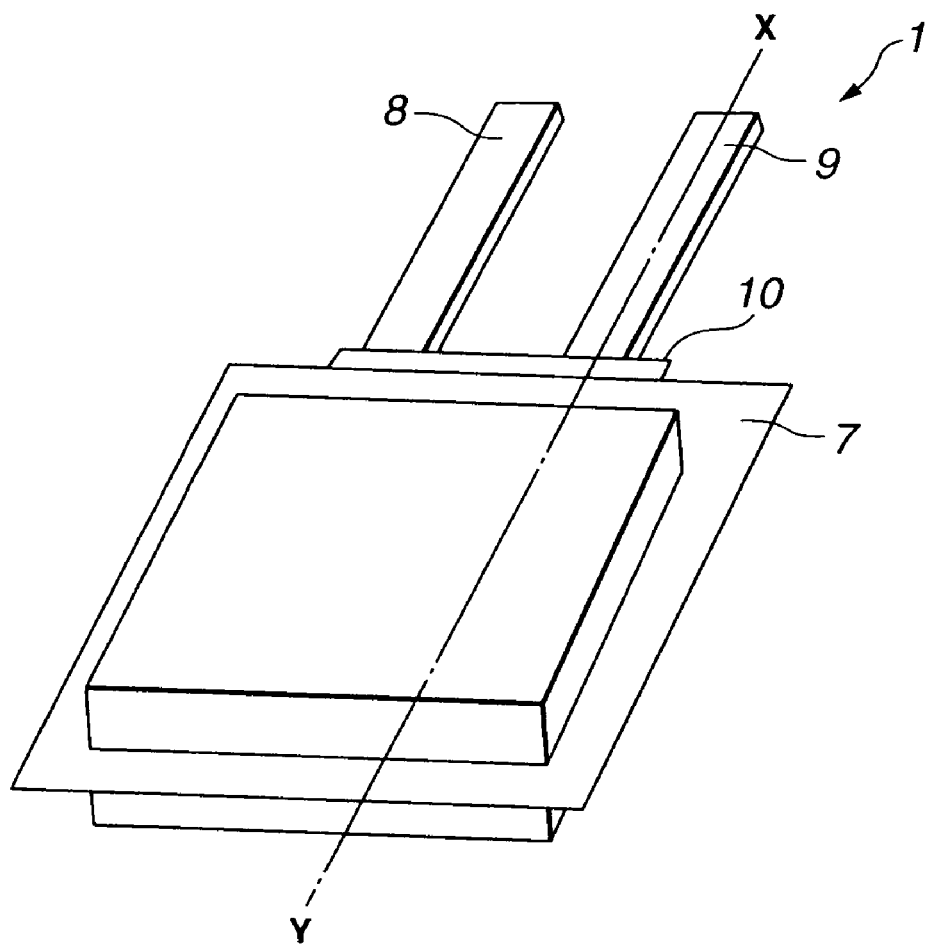
FIG. 1 is a perspective view showing an example of the structure of a solid electrolyte battery according to the present invention.
Figure 2:
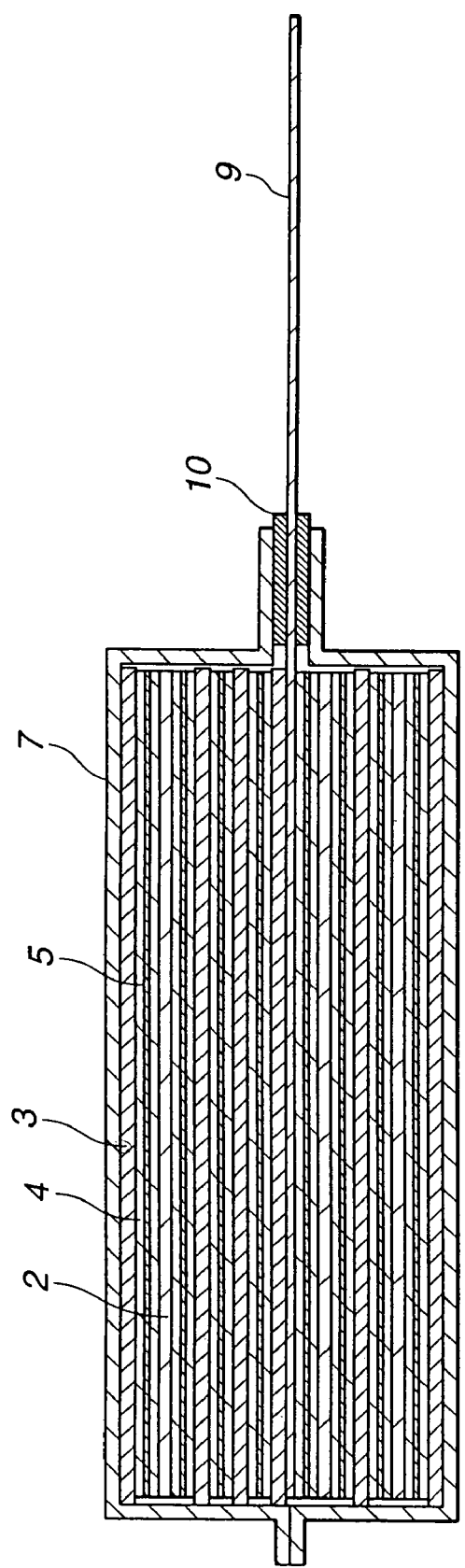
FIG. 2 is a cross sectional view taken along line X-Y shown in FIG. 1.

An example of the structure of a gel electrolyte battery 1 according to this embodiment is shown in FIGS. 1 and 2. The gel electrolyte battery 1 incorporates an elongated positive electrode 2; an elongated negative electrode 3 disposed opposite to the positive electrode 2; a gel electrolyte layer 4 formed on each of the positive electrode 2 and the negative electrode 3; and a separator 5 disposed between the positive electrode 2 having the gel electrolyte layer 4 formed thereon and the negative electrode 3 having the gel electrolyte layer 4 formed thereon.

Figure 3:
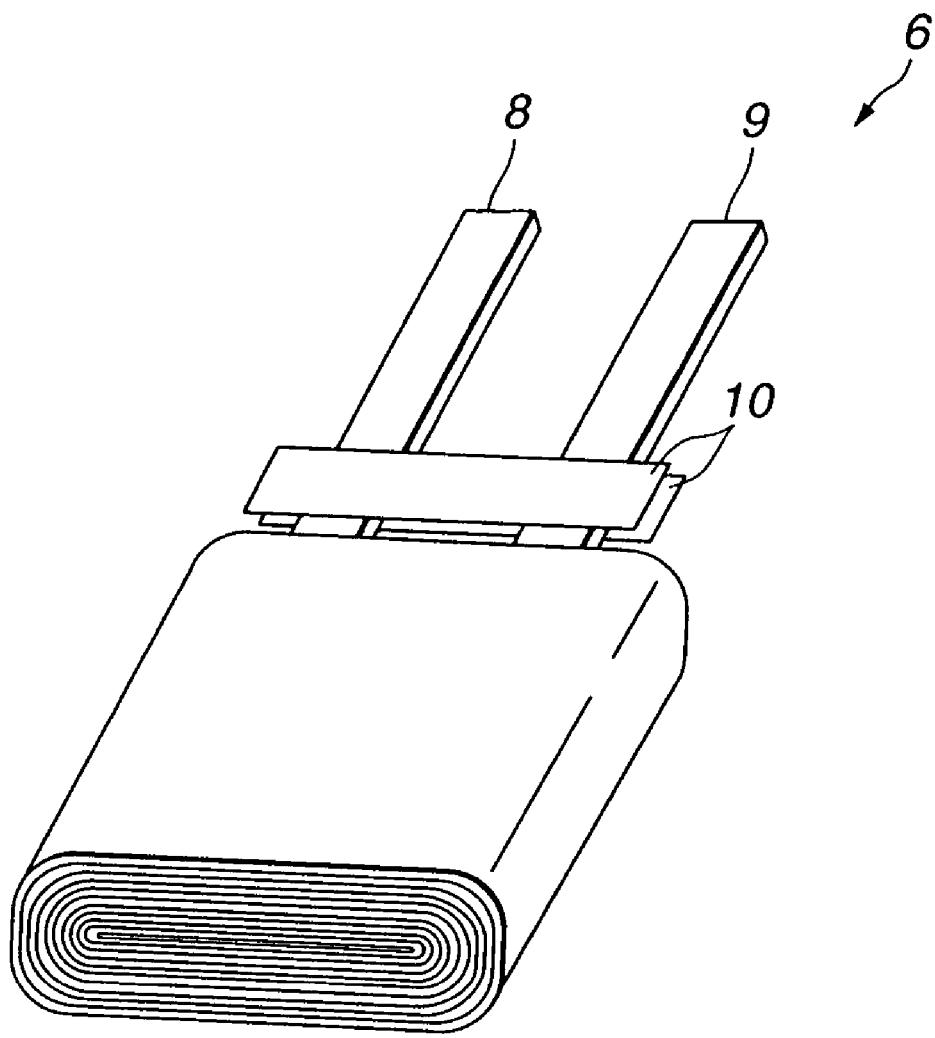
FIG. 3 is a perspective view showing a state where a positive electrode and a negative electrode are formed into a wound electrode.

The gel electrolyte battery 1 has a structure such that the positive electrode 2, having the gel electrolyte layer 4 formed thereon, and the negative electrode 3, having the gel electrolyte layer 4 formed thereon, are laminated through the separator 5. Moreover, a wound electrode 6 shown in FIG. 3 is formed by winding the positive electrode 2 and the negative electrode 3 in a lengthwise direction. The wound electrode 6 is covered with a casing film 7 so as to be hermetically sealed. A positive-electrode terminal 8 is connected to the positive electrode 2, while a negative-electrode terminal 9 is connected to the negative electrode 3. The positive-electrode terminal 8 and the negative-electrode terminal 9 are sandwiched in a sealing region which is the outer periphery of the casing film 7. Each of the regions in which the positive-electrode terminal 8 and the negative-electrode terminal 9 are in contact with the casing film 7 is provided with a resin film 10.

Figure 4:
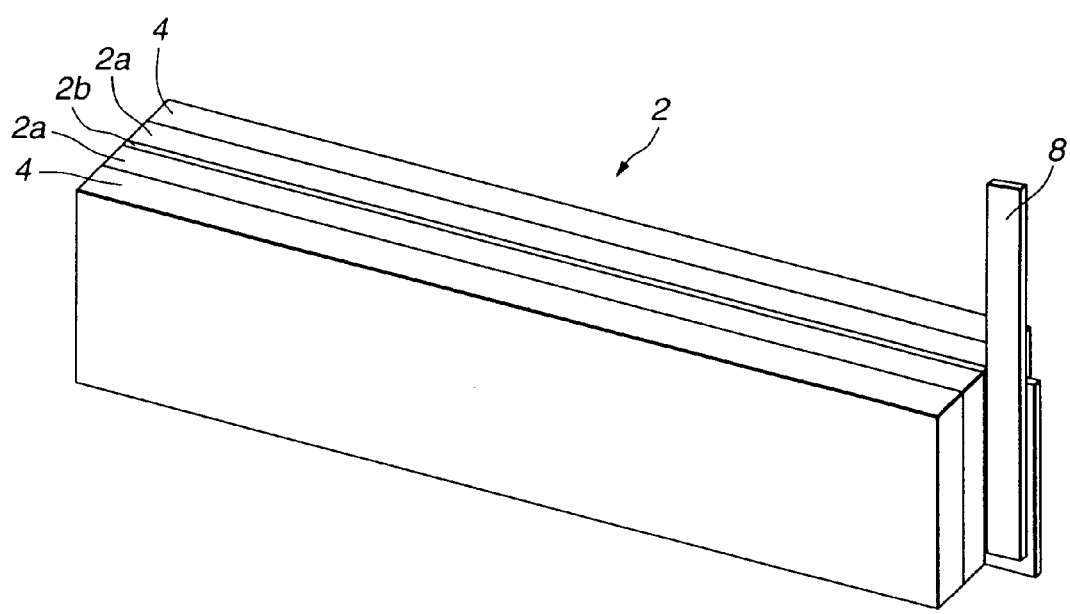
FIG. 4 is a perspective view showing an example of the structure of the positive electrode.

As shown in FIG. 4, the positive electrode 2 incorporates a positive-electrode active material layer 2a containing a positive-electrode active material and formed on each of the two sides of a positive-electrode collector 2b. The positive-electrode collector 2b is constituted by, for example, a metal foil, such as an aluminum foil.

The positive-electrode active material may be a composite lithium oxide, such as cobalt acid lithium, nickel acid lithium or spinel manganese acid lithium. The composite lithium oxide may be employed solely or a plurality of the foregoing materials may be employed.

It is preferable that the composite lithium oxide has a mean particle size of 15 μm or less. When the composite lithium oxide having the mean particle size of 15 μm or less is employed as the positive-electrode active material, a gel electrolyte battery can be obtained which has low internal resistance and excellent output characteristics.

FIG. 4 shows a state where a gel electrolyte layer 4 to be described later has been formed on the positive-electrode active material layer 2a of the positive electrode 2.

Figure 5:
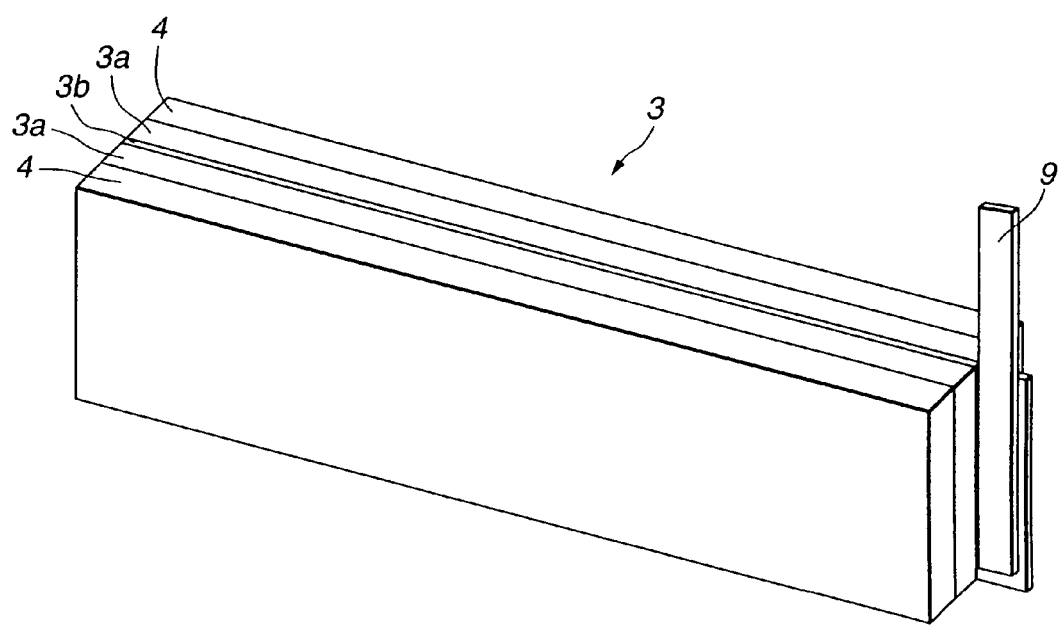
FIG. 5 is a perspective view showing an example of the structure of the negative electrode.

As shown in FIG. 5, the negative electrode 3 incorporate a negative-electrode active material layer 3a containing a negative-electrode active material and formed on each of two sides of a negative-electrode collector 3b. The negative-electrode collector 3b is constituted by a metal foil, such as a copper foil.

The negative-electrode active material may be a material to which lithium can be doped/dedoped. The material to which lithium can be doped/dedoped may be lithium, its alloy or a carbon material. Specifically, the carbon material is exemplified by carbon black, such as natural graphite, artificial graphite, pyrocarbon, cokes or acetylene black; vitreous carbon; active carbon; carbon fiber; a sintered material of an organic polymer; a sintered material of coffee beans; a sintered material of cellulose; or a sintered material of bamboo.

The inventor has energetically performed studies. As a result, a fact has been detected that methocarbon microbead carbon graphitized at a baking temperature of about 2800° C. is a preferred material. The methocarbon microbead carbon has high electro-chemical stability with respect to an electrolytic solution. Therefore, an effect can be obtained when it is combined with a gel electrolyte of a type adapted to an electrolytic solution containing propylene carbonate.

It is preferable that the methocarbon microbead carbon has a mean particle size from 6 μm to 25 μm. As the mean particle size of the methocarbon microbead carbon is reduced, the overvoltage in the electrode reaction can be reduced. As a result, the output characteristics of the battery can be improved. To raise the electrode filling density, it is advantage to enlarge the mean particle size. Therefore, it is preferable that methocarbon microbead carbon having a mean particle size from 6 μm to 25 μm is employed.

FIG. 5 shows a state where the gel electrolyte layer 4 to be described later has been formed on the negative-electrode active material layer 3a of the negative electrode 3.

The gel electrolyte layer 4 contains an electrolyte salt, a matrix polymer and a swelling solvent which serves as a plasticizer.

The electrolyte salt may be any one of $LiPF_6$, $LiClO_4$, $LiCF_3SO_3$, $LiAsF_6$, $LiBF_4$, $LiN(CF_3SO_3)_2$ and $C_4F_9SO_3Li$ which may be employed solely or their combination may be employed. In particular, it is preferable that $LiPF_6$ is employed from a viewpoint of obtaining satisfactory ion conductivity.

The matrix polymer must have an ion conductivity of 1 mS/cm or greater at room temperature whether used as a sole polymer or used in the form of a gel electrolyte. When the foregoing ion conductivity is realized, the chemical structure of the matrix polymer is not limited. The matrix polymer is exemplified by polyvinylidene fluoride, polyacrylonitrile, polyethylene oxide, a polysiloxane compound, a polyphosphagen compound, polypropylene oxide, polymethylmethacrylate, polymethacrylonitrile and a polyether compound. Also a material obtained by copolymerizing another polymer with the foregoing polymers may be employed. From a viewpoint of realizing chemical stability and ion conductivity, a material is employed constituted of polyvinylidene fluoride and hexafluoroproylene, such that hexafluoropropylene is contained in a quantity less than 8%.

The swelling solvent may be a nonaqueous solvent exemplified by ethylene carbonate, propylene carbonate, γ-butylolactone, acetonitrile, diethylether, diethyl carbonate, dimethyl carbonate, 1,2-dimethoxyethane, dimethylsulfoxide, 1,3-dioxolane, methylsulfomate, 2-methyltetrahydrofuran, tetrahydrofuran, sulfolane, 2,4-difluoroanisol and vinylene carbonate. The foregoing materials may be employed solely or their mixture may be employed.

In particular, it is preferable that a material, such as ethylene carbonate, propylene carbonate or γ-butylolactone, having a relatively wide potential window, is employed. Note that the potential window is a potential region in which the solvent is stably present.

When 2,4-difluoroanisol or vinylene carbonate is added in a quantity from 0.5% to 5% of the overall weight of the solvent, the characteristics of the battery sometimes can be improved.

It is preferable that the gel electrolyte layer 4 has a structure such that the ratio of the matrix polymer to the swelling solvent is not less than 1:5 nor greater than 1:10. When the quantity of the swelling solvent is greater than five times the quantity of the matrix polymer, the electrolytic solution component in the gel electrolyte is too small. Thus, the ion conductivity of the gel electrolyte layer 4 deteriorates. When the quantity of the swelling solvent is greater than 10 times the quantity of the matrix polymer, the gel electrolyte becomes brittle. Thus, satisfactory liquid holding performance of the matrix polymer cannot be obtained.

When the ratio of the matrix polymer to the swelling solvent satisfies the foregoing range, the liquid holding performance of the matrix polymer can be maintained. Moreover, the ion conductivity of the gel electrolyte layer 4 can be maintained.

It is preferable that the thickness of the gel electrolyte layer 4 is not less than 5 μm nor greater than 19 μm. When the thickness of the gel electrolyte layer 4 is less than 5 μm, a quantity of gel required to cause the electrode reaction to proceed smoothly cannot easily be obtained. When the thickness of the gel electrolyte layer 4 is greater than 19 µm, the distance between the positive electrode 2 and the negative electrode 3 is elongated. As the distance between the two electrodes is elongated, the energy density of the battery and the output characteristics of the same deteriorate excessively. Therefore, the thickness of the gel electrolyte layer 4 is made to be not less than 5 µm nor greater than 19 µm. Thus, deterioration in the energy density of the battery and that of the output characteristics can be prevented during the reaction of the electrode.

The separator 5 disposed between the positive electrode 2 and the negative electrode 3 prevents short circuiting caused from physical contact between the positive electrode 2 and the negative electrode 3.

The thickness of the separator 5 according to this embodiment is not less than 5 µm nor greater than 15 µm. When the thickness of the separator 5 is less than 5 µm, the separator 5 cannot easily be handled during a process for manufacturing the battery. As a result, the manufacturing yield of the gel electrolyte battery 1 deteriorates. When the thickness of the separator 5 is greater than 15 µm, the internal resistance of the gel electrolyte battery 1 is raised excessively. What is worse, the energy density loss is increased. Therefore, the thickness of the separator 5 is not less than 5 µm nor greater than 15 µm. Hence it follows that deterioration in the manufacturing yield of the gel electrolyte battery 1, increase in the internal resistance, and increase in the energy density loss all can be prevented.

The volume porosity of the separator 5 according to this embodiment is not less than 25% nor greater than 60%. When the volume porosity of the separator 5 is less than 25%, the internal resistance of the gel electrolyte battery 1 is so great that it prevents obtaining the required output characteristics. When the volume porosity of the separator 5 is greater than 60%, satisfactory mechanical strength cannot easily be realized. Therefore, the volume porosity of the separator 5 is made to satisfy a range not less than 25% nor greater than 60%. Thus, the mechanical strength of the separator 5 can be maintained without any rise in the internal resistance of the gel electrolyte battery 1.

The separator 5 according to this embodiment has a shutdown effect when the temperature of the battery is not less than 100° C. nor greater than 160° C. To obtain the shutdown effect when the temperature of the battery is not less than 100° C. nor greater than 160° C., the melting points of the materials constituting the separator 5 must be not less than 100° C. nor greater than 160° C. Since the separator 5 is disposed between electrodes, the separator 5 must have electrochemical stability.

"A shutdown effect obtained when the temperature of the separator 5 is not less than 100° C. nor greater than 160° C." means that the internal impedance of the battery is increased, as compared with the internal impedance at room temperature, by 10° C. or more when the temperature of the battery is not less than 100° C. nor greater than 160° C.

As a material which satisfies the foregoing conditions, a polyolefin polymer is a representative material which is exemplified by polyethylene or polypropylene. In particular, it is preferable that the separator 5 is made of polyethylene. As an alternative to the polyolefin polymer, resin of a type having chemical stability with respect to the gel electrolyte may be employed such that the resin is copolymerized or blended with polyethylene or polypropylene.

As described above, the separator 5 has a thickness not less than 5 µm nor greater than 15 µm, a volume porosity not less than 25% nor greater than 60%, and a shutdown effect when the temperature is not less than 100° C. nor greater than 160° C. Thus, the energy density of the gel electrolyte battery 1 can be raised and safety can be improved.

Moreover, the inventor of the present invention has energetically studied the relationship between the physical properties of the separator 5 and the characteristics of the battery. As a result, the following has been detected: it is preferable that the separator 5 have a thickness not less than 5 µm nor greater than 15 µm, a volume porosity not less than 25% nor greater than 60%, a breaking strength less than 1650 kg/cm$^2$, and a breaking ductility of 135% or more. When the breaking strength and the breaking ductility of the separator 5 cannot satisfy the foregoing ranges, the separator 5 cannot easily be handled in the process for manufacturing the gel electrolyte battery 1. Thus, the manufacturing yield of the gel electrolyte battery 1 deteriorates. What is worse, satisfactory characteristics of the battery cannot be obtained. Therefore, employment of the separator 5 having the breaking strength less than 1650 kg/cm$^2$ and the breaking ductility of 135% or more enables deterioration in the manufacturing yield of the gel electrolyte battery 1 to be prevented. Thus, satisfactory characteristics of the gel electrolyte battery 1 can be obtained.

A tensile test of the separator 5 to evaluate the breaking strength and the breaking ductility of the separator 5 will now be described.

A test piece of the separator 5 substantially in the form of a 30mm×70 mm rectangle is obtained by cutting. Then, a cellophane tape having a width of 10 mm is applied to each of the two lengthwise ends of the test piece.

Then, the obtained test piece is sufficiently clamped in a sample clamping portion of a tensile testing machine. The tensile testing machine may be, for example, model NO. 1310f manufactured by Aiko. The portion of the test piece to be clamped by the sample clamping portion is the portion which is reinforced with the cellophane tape. That is, the portion of the test piece having a length of 50 mm, except for the two-end reinforced portions each having the length of 10 mm, is subjected to the tensile test.

In the foregoing state, that the test piece is placed perpendicularly to the testing machine table is confirmed. Then, the tensile test is started. The tensile strength is 40 mm per minute. Data about the load and the ductility ratio are recorded in a personal computer through an A/D conversion board. In accordance with obtained data, the breaking strength and the breaking ductility are calculated. The load with which the test piece has been broken is employed as the breaking strength. The length (mm) of the test piece immediately before the test piece is broken is measured to obtain the breaking ductility (%) by using Equation (1).

$$\text{Breaking Ductility} = 100 \times (\text{Length of Test Piece Immediately Before Breakage}/50) \quad (1)$$

The above-mentioned means is performed so that a separator 5 according to this embodiment having a breaking strength which is less than 1650 kg/cm$^2$ and the breaking ductility of 135% or greater can be used. When the separator 5 satisfying the foregoing mechanical characteristics is employed, deterioration in the manufacturing yield of the gel electrolyte battery 1 can be prevented. Moreover, satisfactory characteristics of the battery can be obtained.

As described above, the separator 5 is employed which has a thickness not less than 5 µm nor greater than 15 µm, a volume porosity not less than 25% nor greater than 60%, a breaking strength less than 1650 kg/cm$^2$, and a breaking ductility of 135% or more. Thus, high energy density and safety of the gel electrolyte battery 1 can be realized.

One of objects of the separator 5 is to prevent short circuiting caused by physical contact between the positive electrode 2 and the negative electrode 3. The size of the separator 5 is determined based on the sizes of the positive electrode 2 and the negative electrode 3 and the shapes of the battery elements. That is, the opposite electrodes must be completely insulated from each other by the separator 5. Moreover, the terminal of the electrode and the electrode must be insulated from each other by the separator 5. To realize the foregoing state, the size of the separator 5 must be greater than the overall size of each of the positive electrode 2 and the negative electrode 3.

Figure 6:
FIG. 6 is a photograph showing a fibril structure of a separator according to the present invention.

That the separator 5 according to this embodiment has a fine structure, which is a so-called fibril structure as shown in FIG. 6, has been detected from experiments. FIG. 6 is a photograph of the fine structure of the wound electrode 6 taken by an electronic microscope at a magnification of 50,000 times.

As a means for obtaining the separator 5 having the fibril structure, a plurality of methods may be employed. An example of the method will now be described.

Initially, a molten liquid of a low-volatility solvent (a good solvent for the polyolefin composition) is supplied to an extruder containing a molten polyolefin composition, so as to be kneaded. Thus, a high-concentration solution of the polyolefin composition having a uniform concentration is prepared.

The polyolefin is exemplified by polyethylene and polypropylene. It is preferable that polyethylene is employed. The low-volatility solvent may be a low-volatility aliphatic hydrocarbon or a cyclic hydrocarbon, such as nonane, decane, decalin, p-xylene, undecane or a liquid paraffin.

It is preferable that the weight percentage of the polyolefin composition is not less than 10 parts by weight nor greater than 80 parts by weight, with respect to 100 parts by weight which is the total quantity of the two materials, preferably not less than 15 parts by weight nor greater than 70 parts by weight. When the quantity of the polyolefin composition is less than 10 parts by weight, swelling or neck-in occurs excessively at the outlet opening of the die. In the foregoing case, a required sheet cannot easily be formed. When the quantity of the polyolefin composition is greater than 80 parts by weight, a uniform solution cannot easily be prepared. Therefore, the ratio of polyolefin is made to satisfy the range not less than 10 parts by weight nor greater than 80 parts by weight. Thus, the preparation of a uniform solvent and the formation of the sheet can easily be performed.

A heated solution of the polyolefin composition is extruded through the die, so that a sheet of the polyolefin composition solution is obtained, which is then cooled. Thus, a gel sheet is obtained. The cooling process is performed until a temperature not higher than the gelling temperature is realized. As a cooling method, the following methods may be employed: direct contact with cold air, cooling water or other cooling medium; or contact with a roll cooled with a refrigerant.

The polyolefin composition solution extruded from the die may be taken up at a take-up ratio not less than 1 nor greater than 10, preferably not less than 1 nor greater than 5. When the take-up ratio is 10 or greater, great neck-in takes place and breakage easily occurs. When the take-up ratio is not less than 1 nor greater than 10, neck-in and breakage of the gel sheet can be prevented.

Then, the obtained gel sheet is heated so as to be oriented at a predetermined stretch ratio, to obtain an oriented film. The gel sheet is oriented by a usual tenter method, a roll method, a milling method or a method of combination of the foregoing methods. It is preferable that a biaxial orientation method is employed. The biaxial orientation method may be either of simultaneous orientation in the lengthwise and breadthwise directions or a sequential method. In particular, it is preferable that the simultaneous biaxial orientation is employed.

It is preferable that the gel sheet is oriented at a temperature of the melting point of the polyolefin composition+10° C. or less. More preferably, the orienting temperature is not less than the crystal dispersion temperature of the polyolefin composition and less than the melting point of the same. When the orienting temperature is greater than the melting point of the polyolefin composition+10° C., the resin is undesirably melted. In the foregoing case, effective orientation of molecules cannot be realized. When the orienting temperature is less than the crystal dispersing temperature, the resin cannot sufficiently be softened. In the foregoing case, breakage easily occurs in the orienting process and, therefore, orientation at a high stretch ratio cannot be performed. When the orienting temperature of the gel sheet is made to satisfy the foregoing range, uniform and high-stretch ratio orientation can be performed. Moreover, orientation of the molecule chains can effectively be performed.

The obtained oriented film is cleaned with a volatile solvent to remove residual low-volatility solvent. The volatile solvent for use in the cleaning process may be a hydrocarbon, such as pentane, hexane or heptane; a hydrogen fluoride, such as ethane trifluoride; or an ether, such as diethylether or dioxane. The foregoing materials are employed solely or the foregoing materials may be mixed. The solvent for cleaning the oriented film is selected to be compatible with the low-volatility solvent used to dissolve the polyolefin composition.

The oriented film may be cleaned by a method in which the oriented film is immersed in the solvent to extract the low-volatility solvent left in the oriented film; a method in which the oriented film is showered with the solvent; or their combination. The oriented film is cleaned until the quantity of the low-volatility solvent left in the oriented film is less than one part by weight.

Finally, the solvent used to clean the oriented film is dried so as to be removed. The solvent is dried by heating or air spraying. After the foregoing process has been completed, the separator 5 according to this embodiment can be obtained. The thus-obtained separator 5 has the fibril structure as shown in FIG. 6.

The gel electrolyte battery 1 according to this embodiment and incorporating the foregoing separator 5 is prepared as follows.

The positive electrode 2 is prepared as follows: a positive-electrode mix containing the positive-electrode active material and a binder is uniformly applied to the surface of a metal foil, such as an aluminum foil, which is formed into the positive-electrode collector 2b, and then the positive-electrode mix is dried. Thus, the positive-electrode active material layer 2a is formed so that a positive electrode sheet is formed. The binder of the positive-electrode mix may be a conventional binder. Note that conventional additives may be added to the positive-electrode mix.

Then, the gel electrolyte layer 4 is formed on the positive-electrode active material layer 2a of the positive electrode sheet. To form the gel electrolyte layer 4, a first step is performed so that the electrolyte salt is dissolved in the nonaqueous solvent. Thus, a nonaqueous electrolytic solution is prepared. The matrix polymer is added to the nonaqueous electrolytic solution, and then the solution is sufficiently stirred to dissolve the matrix polymer. As a result, a sol electrolyte solution is prepared.

Then, the electrolyte solution, in a predetermined quantity, is applied to the surface of the positive-electrode active material layer 2a. Then, the positive-electrode active material layer 2a is cooled at room temperature so as to gel the matrix polymer. Hence it follows that the gel electrolyte layer 4 is formed on the positive-electrode active material layer 2a.

Then, the positive electrode sheet having the gel electrolyte layer 4 formed thereon is cut to obtain elongated members. An aluminum lead wire is welded to a portion of the positive-electrode collector 2b in which the positive-electrode active material layer 2a is not formed so that the positive-electrode terminal 8 is formed. Thus, the elongated positive electrode 2 having the gel electrolyte layer 4 formed thereon can be obtained.

The negative electrode 3 is formed as follows: a negative-electrode mix containing a negative-electrode active material and a binder is uniformly applied to a metal foil, such as a copper foil, which is formed into the negative-electrode collector 3b. Then, the metal foil is dried so that a negative electrode sheet having the negative-electrode active material layer 3a formed thereon is prepared. The binder may be a conventional binder. Note that conventional additives may be added to the negative-electrode mix.

Then, the gel electrolyte layer 4 is formed on the negative-electrode collector 3b. To form the gel electrolyte layer 4, a process similar to the foregoing process is performed so that an electrolyte solution prepared similarly to the foregoing process is applied to the negative-electrode active material layer in a predetermined quantity. Then, the negative-electrode active material layer is dried at room temperature to gel the matrix polymer. As a result, the gel electrolyte layer 4 is formed on the negative-electrode collector 3b.

Then, the negative electrode sheet having the gel electrolyte layer 4 formed thereon is cut to obtain elongated members. A lead wire constituted by, for example, nickel, is welded to a portion of the negative-electrode collector 3b in which the negative-electrode active material layer 3a is not formed. Thus, the negative-electrode terminal 9 is formed. Thus, the elongated negative electrode 3 having the gel electrolyte layer 4 formed thereon can be obtained.

The surfaces of the thus-prepared elongated positive electrode 2 and the negative electrode 3, each having the gel electrolyte layer 4 formed thereon, are disposed opposite to each other. The separator 5 is inserted between the positive electrode 2 and the negative electrode 3 to bond and press the laminate. Thus, an electrode laminate is obtained. The electrode laminate is wound in the lengthwise direction so that the wound electrode 6 is obtained.

Finally, the wound electrode 6 is sandwiched in the casing film 7. Then, the resin film 10 is disposed in each region where the positive-electrode terminal 8, the negative-electrode terminal 9, and the casing film 7 overlap. Then, the outer periphery of the casing film 7 is sealed. Then, the positive-electrode terminal 8 and the negative-electrode terminal 9 are sandwiched in the sealing opening of the casing film 7. Moreover, the wound electrode 6 is hermetically enclosed in the casing film 7. After the wound electrode 6 is packed in the casing film 7, the wound electrode 6 is subjected to heat treatment. Thus, the gel electrolyte battery 1 can be prepared.

When the wound electrode 6 is packed in the casing film 7, the resin film 10 is disposed in each of the contact regions between the casing film 7 and the positive-electrode terminal 8 and between the casing film 7 and the negative-electrode terminal 9. Therefore, the occurrence of short circuiting caused by burrs of the casing film 7 or the like can be prevented. Moreover, the adhesion between the casing film 7 and the positive-electrode terminal 8 and between the casing film 7 and the negative-electrode terminal 9 can be improved.

The resin film 10 may be constituted by a material adherent to the positive-electrode terminal 8 and the negative-electrode terminal 9. When the material has the foregoing adhesion, the material is not limited. It is preferable that any one of polyethylene, polypropylene, denatured polyethylene, denatured polypropylene, their copolymers and polyolefin resin is employed. It is preferable that the thickness of the resin film 10 realized before thermal bonding is from 20 μm to 300 μm. When the thickness of the resin film 10 is less than 20 μm, handling deteriorates. When the thickness is greater than 300 μm, water easily penetrates the resin film 10. As a result, the airtightness in the battery cannot be easily maintained.

In the foregoing embodiment, the elongated positive electrode 2 and the elongated negative electrode 3 are laminated. Then, the laminate is wound in the lengthwise direction to form the wound electrode 6. The present invention is not limited to the foregoing structure. The present invention may be applied to a structure in which a rectangular positive electrode 2 and a rectangular negative electrode 3 are laminated to form the electrode laminate or a structure in which the electrode laminate is alternately folded.

In the foregoing embodiment, the electrolyte to be interposed between the positive electrode 2 and the negative electrode 3 is the gel electrolyte containing swelling solvent. The present invention is not limited to the foregoing structure. The present invention may be applied to a structure in which a solid electrolyte which does not contain the swelling solvent is employed.

The solid electrolyte must have an ion conductivity of 1 mS/cm or greater at room temperature. When the solid electrolyte has the foregoing characteristic, its chemical structure is not limited. The solid electrolyte of the foregoing type is exemplified by an organic solid electrolyte obtained by dissolving an inorganic salt in any one of polyvinylidene fluoride, polyacrylonitrile, polyethylene oxide, a polysiloxane compound, a polyphosphagen compound, polypropylene oxide, polymethylmethacrylate, polymethacrylonitrile or a polyether compound; an ion-conductive ceramic material or ion-conductive glass.

The shape of the gel electrolyte battery 1 according to this embodiment is not limited. For example, a cylindrical shape, a rectangular shape, a coin shape or the like may be employed. The present invention may be applied to both a primary battery and a secondary battery.

Second Embodiment

Figure 7:
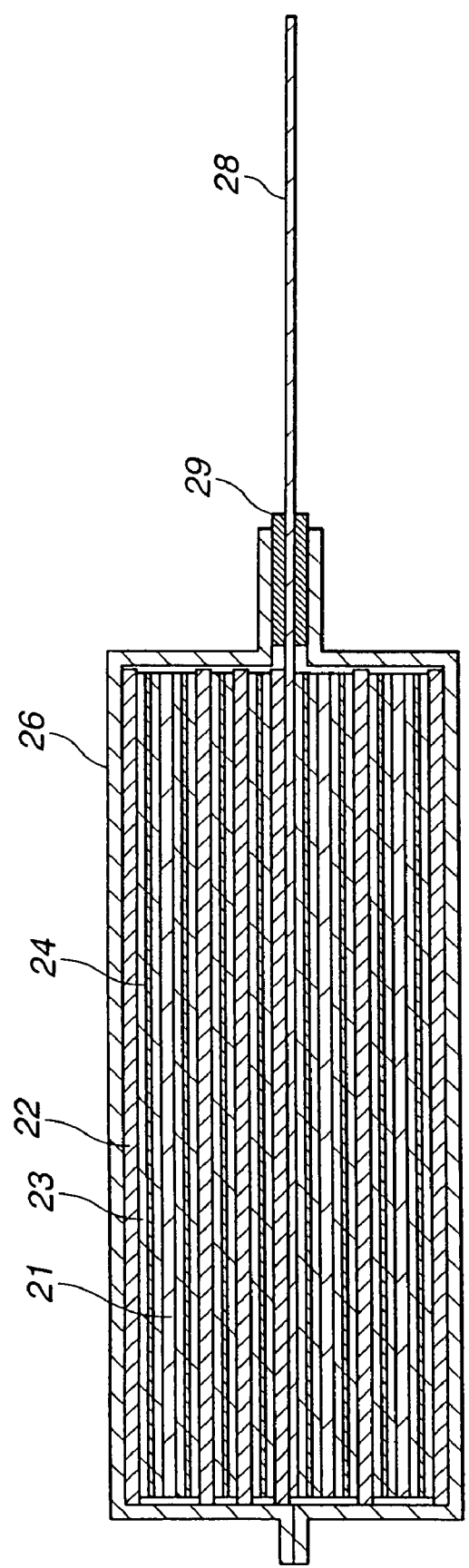
FIG. 7 is a perspective view showing an example of the structure of the solid electrolyte battery according to the present invention.
Figure 8:
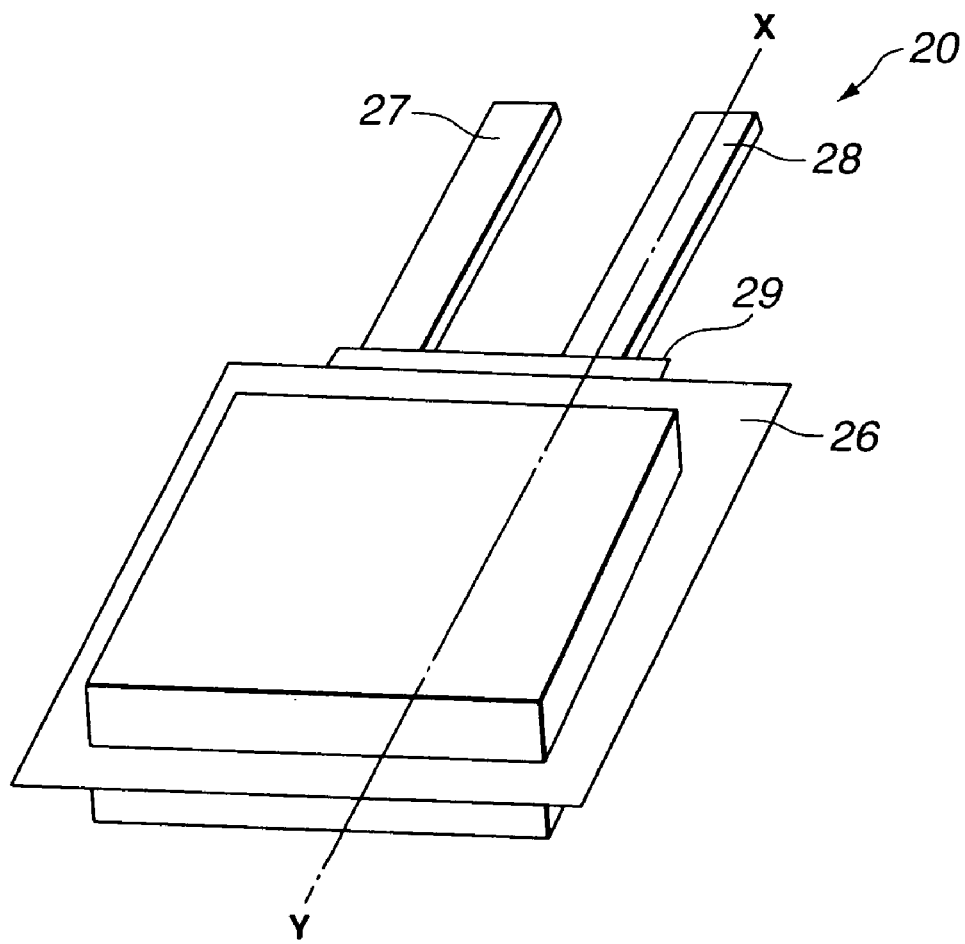
FIG. 8 is a cross sectional view taken along line X-Y shown in FIG. 7.

An example of the structure of a gel electrolyte battery 20 according to this embodiment is shown in FIGS. 7 and 8. The gel electrolyte battery 20 incorporates an elongated positive electrode 21; an elongated negative electrode 22 disposed opposite to the positive electrode 21; a gel electrolyte layer 23 formed on each of the positive electrode 21 and the negative electrode 22; and a separator 24 disposed between the positive electrode 21 having the gel electrolyte layer 23 formed thereon and the negative electrode 22 having the gel electrolyte layer 23 formed thereon.

Figure 9:
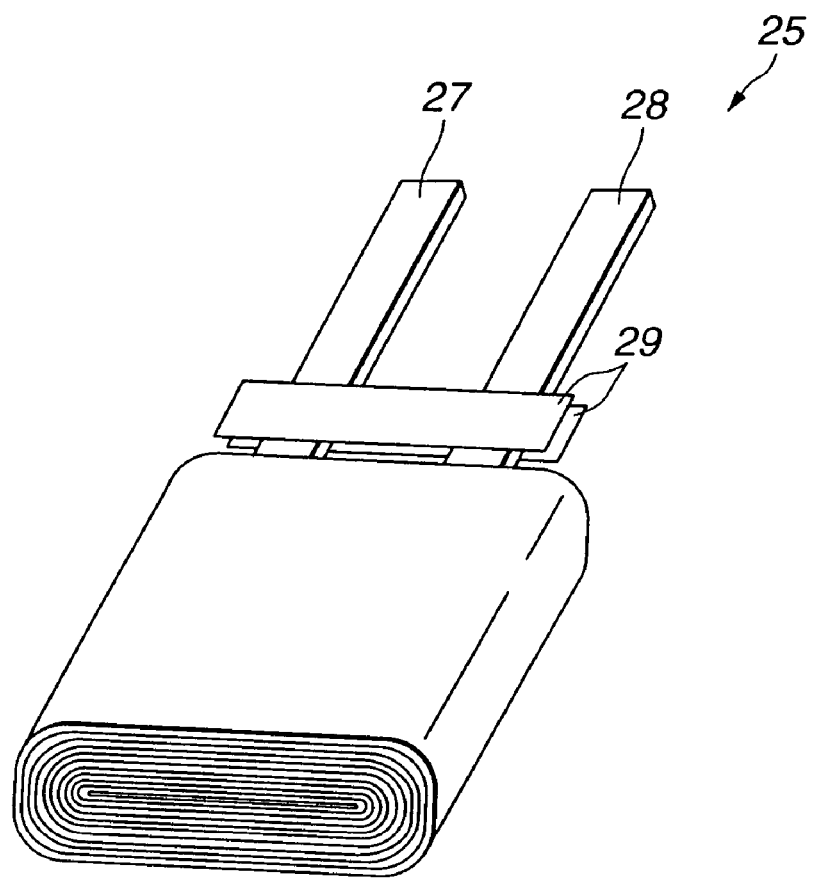
FIG. 9 is a perspective view showing a state where a positive electrode and a negative electrode are formed into a wound electrode.

The gel electrolyte battery 20 incorporates the positive electrode 21 having the gel electrolyte layer 23 formed thereon and the negative electrode 22 having the gel electrolyte layer 23 formed thereon. The positive electrode 21 and the negative electrode 22 are laminated by the separator 24 and wound in the lengthwise direction so that a wound electrode 25 having the structure shown in FIG. 9 is formed. The wound electrode 25 is covered with a casing film 26 made of an insulating material, so that the wound electrode 25 is sealed by the casing film 26. A positive-electrode terminal 27 is connected to the positive electrode 21, while a negative-electrode terminal 28 is connected to the negative electrode 22. The positive-electrode terminal 27 and the negative-electrode terminal 28 are sandwiched in a sealing opening which is the outer periphery of the casing film 26. The regions in which the positive-electrode terminal 27 and the negative-electrode terminal 28 are in contact with the casing film 26 are provided with resin film 29.

Figure 10:
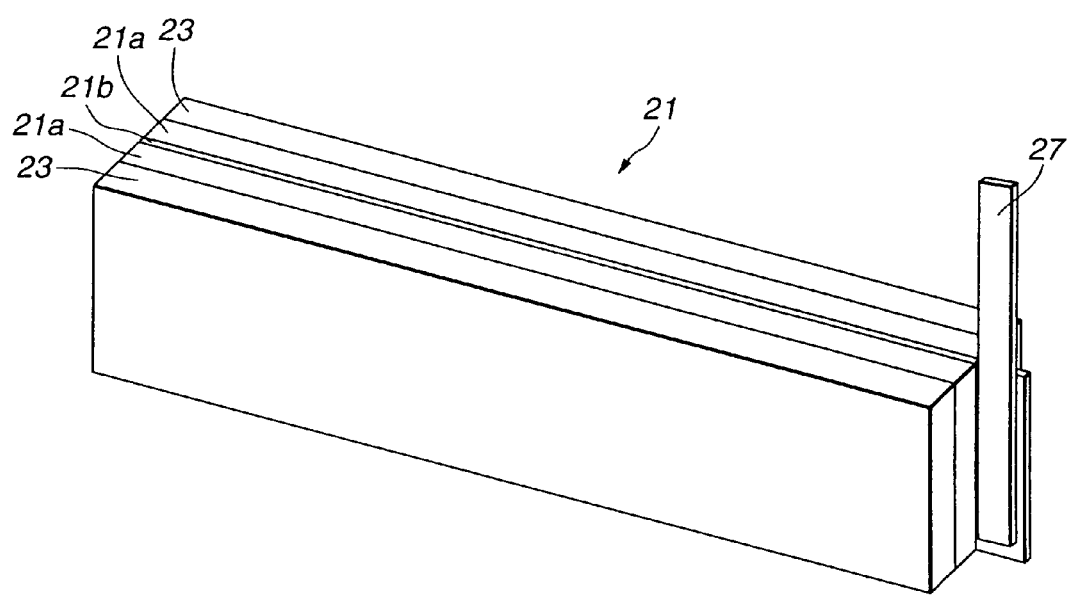
FIG. 10 is a perspective view showing an example of the structure of the positive electrode.

As shown in FIG. 10, the positive electrode 21 incorporates a positive-electrode active material layer 21a containing a positive-electrode active material and formed on a positive electrode collector 21b. The positive electrode collector 21b may be constituted by a metal foil, such as an aluminum foil.

The positive-electrode active material may be a material which permits implantation and separation of positive ions. Ions above are exemplified by Li ions. Specifically, the positive-electrode active material is exemplified by $LiCoO_2$, $LiNiO_2$ and $LiMn_2O_4$. Two or more types of transition metal elements may be employed as well as use of a sole transition metal element. Specifically, $LiNi_{0.5}Co_{0.5}O_2$ or the like may be employed.

The positive-electrode active material layer 21a is formed as follows: the foregoing positive-electrode active material, a carbon material serving as a conductive material and polyvinylidene fluoride serving as a binder are mixed. Then, N-methylpyrolidone serving as solvent is added so that paste is prepared. The obtained paste is uniformly applied to the surface of the aluminum foil which is formed into the positive electrode collector by a doctor blade method. Then, the aluminum foil is dried at high temperatures so that the N-methylpyrolidone is removed.

As for the mixture ratio of the positive-electrode active material, the conductor, the binder and N-methylpyrolidone, the mixture ratio is not limited. The necessity lies in that a paste is realized in which the mixture is uniformly dispersed.

FIG. 10 shows a state where a gel electrolyte layer 23 to be described later is formed on the positive-electrode active material layer 21a of the positive electrode 21.

Figure 11:
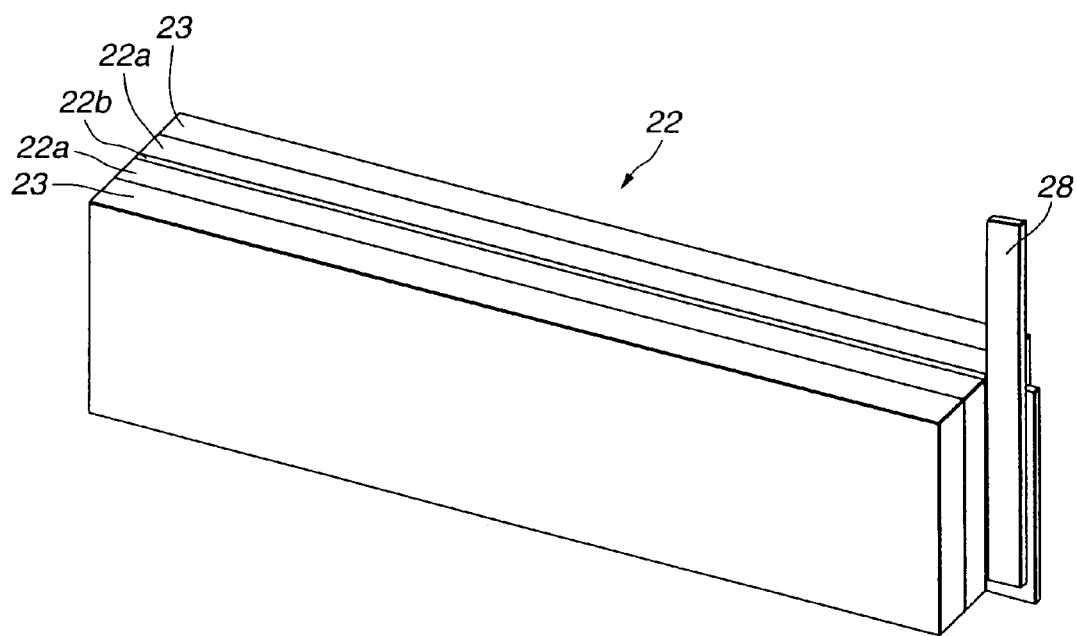
FIG. 11 is a perspective view showing an example of the structure of the negative electrode.

As shown in FIG. 11, the negative electrode 22 incorporates a negative-electrode active material layer 22a containing a negative-electrode active material and formed on the negative electrode collector 22b. The negative electrode collector 22b is constituted by, for example, a metal foil, such as a copper foil.

The negative-electrode active material may be a material which permits implantation and separation of Li and which is exemplified by graphite, non-graphitizable carbon or graphitizable carbon.

The negative-electrode active material layer 22a is formed as follows: the foregoing negative-electrode active material and polyvinylidene fluoride serving as the binder are mixed with each other. Then, N-methylpyrolidone serving as solvent is added to prepare a paste. The obtained paste is uniformly applied to the surface of a copper foil which is formed into a negative-electrode collector by the doctor blade method. Then, the copper foil is dried at high temperatures to remove N-methylpyrolidone. Thus, the negative-electrode active material layer 22a is formed.

The mixture ratio of the negative-electrode active material, the binder and N-methylpyrolidone is determined to prepare a paste in which the mixture is uniformly dispersed. Therefore, the mixture ratio is not limited. "Permitting insertion and separation of Li" is not limited to insertion and removal of Li with respect to the inside portion of the crystal structure. When charge and discharge are permitted in a case of a completed battery, a determination is made that implantation and separation can be performed. The negative electrode is exemplified by a Li negative electrode and a Li—Al alloy negative electrode.

FIG. 11 shows a state where a gel electrolyte layer 23 to be described later has been formed on the negative-electrode active material layer 22a of the negative electrode 22.

The gel electrolyte layer 23 contains an electrolyte salt, a matrix polymer and a solvent serving as a plasticizer.

The matrix polymer must have compatibility with the solvent. The material is exemplified by polyacrylonitrile, a polyethylene oxide polymer, polyvinylidene fluoride, a copolymer of polyvinylidene fluoride and hexafluoropropylene, styrene-butadiene rubber and polymethylmethacrylate. Two or more types of matrix polymers may be employed as well as the use only one type. A polymer which is not included in the foregoing examples, which has compatibility with the solvent and which is formed into gel may be employed.

The solvent is a solvent which can be dispersed in the matrix polymer. A nonaqueous solvent is exemplified by ethylene carbonate, propylene carbonate, butylene carbonate, γ-butylolactone, diethyl carbonate, dimethyl carbonate, ethylmethyl carbonate and dimethoxyethane. Only one type of the foregoing materials may be employed as the solvent or two or more types of the foregoing materials may be employed.

The electrolyte salt must be soluble in the foregoing solvent. Suitable cations are exemplified by alkali metal and alkaline earth metal cations. Suitable anions are exemplified by $Cl^-$, $Br^-$, $I^-$, $SCN^-$, $ClO_4^-$, $BF_4^-$, $PF_6^-$, $CF_3SO_3^-$ and $(CF_3SO_2)_2N^-$ anions. The concentration of the electrolyte salt must be a concentration such that the electrolyte salt can be dissolved in the solvent.

It is preferable that the thickness of the gel electrolyte layer 23 is from 5 μm or greater to 15 μm or smaller. When the thickness of the gel electrolyte layer 23 is less than 5 μm, short circuiting caused by contact between the positive electrode and the negative electrode cannot be prevented. When the thickness of the gel electrolyte layer 23 is greater than 15 μm, resistance against a large load deteriorates and the volume energy density is lessened.

The separator 24 is disposed between the positive electrode 2 and the negative electrode 3 to prevent short circuiting caused by the physical contact between the positive electrode 2 and the negative electrode 3. The separator 24 according to this embodiment is constituted by a composite material of polyethylene and polypropylene obtained by adding polypropylene to polyethylene. When the separator 24 is constituted by the composite material of polyethylene and polypropylene, the melt-down temperature can be raised, while maintaining the shutdown temperature of the separator 24 similar to that of a polyethylene separator.

Specifically, it is preferable that the melt-down temperature of the separator 24 is greater than the melt-down temperature of the polyethylene separator by from 10° C. or greater to 30° C. or less. The melt-down temperature is a temperature at which the shutdown separator 24 is melted and broken.

When the melt-down temperature of the separator 24 is greater than the melt-down temperature of the polyethylene separator by less than 10° C., the effect of the present invention to raise the melt-down temperature cannot satisfactorily be obtained. The reason why the melt-down temperature of the separator 24 is greater than the melt-down temperature of the polyethylene separator by not greater than 30° C. will now be described. That is, the difference between the melt-down temperature of the polypropylene separator and that of the polyethylene separator is about 30° C.

It is preferable that the thickness of the separator 24 according to this embodiment is from 5 μm or greater to 15 μm or less. When the thickness of the separator 24 is less than 5 μm, the separator 24 cannot easily be handled when the battery is assembled. Thus, the manufacturing yield of the battery deteriorates. When the thickness of the separator 24 is greater than 15 μm, the internal resistance of the battery is raised. What is worse, the energy density loss is increased undesirably. Therefore, the thickness of the separator 24 is made to satisfy the range from 5 μm or greater to 15 μm or less. Thus, deterioration in the manufacturing yield of the battery, rising of the internal resistance of the battery and the energy density loss can be prevented.

It is preferable that the volume porosity of the separator 24 is not less than 25% nor greater than 60%. When the volume porosity of the separator 24 is less than 25%, the internal resistance of the battery is so great that it prevents obtaining the required output characteristics. When the volume porosity of the separator 24 is greater than 60%, satisfactory mechanical strength of the separator cannot be obtained. Therefore, the volume porosity of the separator 24 is made to satisfy the range not less than 25% nor greater than 60%. Thus, the mechanical strength of the separator 24 can be maintained without any increase in the internal resistance of the battery.

As described above, the separator 24 according to this embodiment is prepared, for example, as follows. Note that the method for preparing the separator 24 is not limited to the following specific values. Also the mixture ratio of the polyethylene and polypropylene which constitute the separator 24 is not limited to the following value.

Initially, 0.375 part by weight of an oxidation inhibitor is added to 100 parts by weight of a polyolefin mixture composed of 20 wt % of ultra-high molecular weight polyethylene (UHMWPE) having a weight average molecular weight (Mw) of $2.5 \times 10^6$, 30 wt % of high-density polyethylene (HDPE) having a weight average molecular weight (Mw) of $3.5 \times 10^5$, and 50 wt % of polypropylene having a weight average molecular weight (Mw) of $5.1 \times 10^5$ so that a polyolefin composition is prepared.

Then, 30 parts by weight of the polyolefin composition is introduced into a biaxial extruder (having a diameter of 58 mm, L/D=42 and strong kneading type). Moreover, 70 parts by weight of liquid paraffin is supplied through a side feeder so as to be melted and kneaded at 200 rpm so that polyolefin solution is prepared in the extruder.

Then, the polyolefin solution is extruded from a T-die disposed at the leading end of the extruder at 190° C. so as to be wound around a cooling roll. Thus, a gel sheet is molded. Then, the gel sheet is simultaneously double-axis oriented at 115° C. to obtain a 5×5 oriented film. The obtained oriented film is cleaned with methylene chloride to extract and remove liquid paraffin. Then, the oriented film is dried and subjected to heat treatment. Thus, a fine-porous separator 24 constituted by a composite material of polyethylene and polypropylene is obtained.

Figure 12:
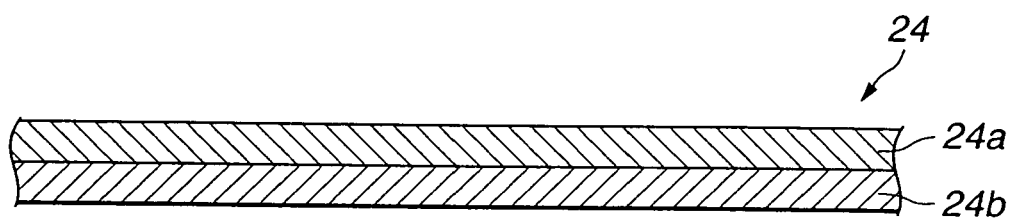
FIG. 12 is a cross sectional view showing an example of a separator according to the present invention.

The separator 24 according to this embodiment constituted by the composite material of polyethylene and polypropylene may be structured by bonding each of a separator 24a constituted by polyethylene and a separator 24b constituted by polypropylene to each other as shown in FIG. 12. When the separator 24a constituted by polyethylene and the separator 24b constituted by polypropylene are bonded to each other, the melt-down temperature of the separator 24 can be raised to the melting point of the polypropylene while maintaining the shutdown temperature of the separator 24 which is the temperature of polyethylene.

The reason why each of the separator 24a constituted by polyethylene and the separator 24b constituted by polypropylene are bonded to each other will now be described. When three or more separators are overlaid, the thickness of the separator is increased excessively to prevent increase in the internal resistance of the battery. Thus, there arises a problem in that the energy density loss is increased undesirably. Therefore, each of the separator 24a constituted by polyethylene and the separator 24b constituted by polypropylene are bonded to each other so that the thickness of the separator is reduced as much as possible. Thus, a maximum effect can be obtained.

When the separator 24 is formed into the foregoing bonded structure, it is preferable that the thickness of each of the separator 24a constituted by polyethylene and the separator 24b constituted by polypropylene is not less than 2.5 μm nor greater than 7.5 μm. Moreover, it is preferable that the total thickness of the two separators is not less than 5 μm nor greater than 15 μm. When the thickness of the separator 24 is less than 5 μm, the separator 24 cannot easily be handled when the battery is assembled. Thus, the manufacturing yield of the battery deteriorates. When the thickness of the separator 24 is greater than 15 μm, the internal resistance of the battery is raised excessively. What is worse, there arises a problem in that the energy density loss is increased. Therefore, the thickness of the separator 24 is made to satisfy the range not less than 5 μm nor greater than 15 μm. Thus, deterioration in the manufacturing yield of the battery, increase in the internal resistance of the battery and great energy density loss can be prevented.

Figure 13:
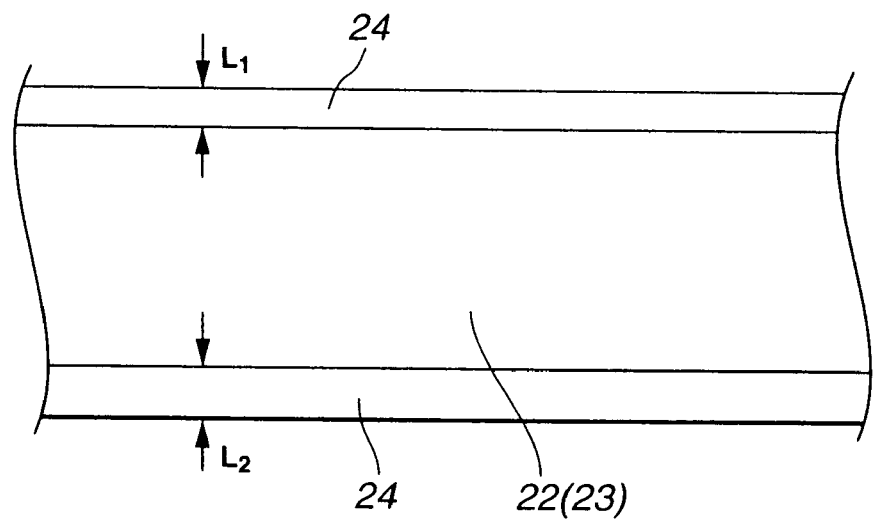
FIG. 13 is a schematic view showing the relationship between the width of the separator and that of the electrode.

The separator 24 according to this embodiment must have a width greater than the width of each of the positive electrode 22 and the negative electrode 23, as shown in FIG. 13. When the positive electrode 22, the negative electrode 23 and the separator 24 are overlaid and wound, deviations of the positive electrode 22, the negative electrode 23 and the separator 24 sometimes occur. Assuming that the amount of the width-wise directional deviations are $L_1$ and $L_2$ when the positive electrode 22, the negative electrode 23 and the separator 24 have been overlaid as shown in FIG. 13, the positive electrode 22 and the negative electrode 23 are brought into contact with each other when $L_1<0$ or $L_2<0$. That is, when the end of the separator 24 is shorter than the end of the positive electrode 22 or the negative electrode 23, contact occurs. As a result, internal short circuiting occurs, causing the manufacturing yield of the battery to deteriorate.

Therefore, when deviation takes place in a process for overlaying and winding the positive electrode 22, the negative electrode 23 and the separator 24, occurrence of the contact between the positive electrode 22 and the gel electrolyte layer 23 must be prevented. Thus, the width of the separator 24 must be somewhat greater than the width of each of the positive electrode 22 and the negative electrode 23. In a case where the width of the separator 24 is excessively increased, the energy density of the battery is lessened. Therefore, the width of the separator 24 must be determined in such a manner that $L_1>0.5$ mm, $L_2>0.5$ mm and $L_1+L_2<4$ mm as shown in FIG. 13. When the separator 24 has the foregoing width, occurrence of internal short circuiting caused by the positive electrode 22 and the gel electrolyte layer 23 can be prevented in case of deviation between the positive electrode 22, the negative electrode 23 and the separator 24. As a result, deterioration in the manufacturing yield can be prevented.

The gel electrolyte battery 20 incorporating the above-mentioned separator 24 and according to this embodiment is prepared as follows.

Initially, the positive electrode 21 is prepared as follows: a positive-electrode mix containing a positive-electrode active material and a binder is uniformly applied to the surface of a metal foil, such as an aluminum foil, which is formed into the positive electrode collector 21b. Then, the metal foil is dried so that the positive-electrode active material layer 21a is formed. Thus, a sheet of the positive electrode 2 is prepared. The binder of the positive-electrode mix may be a conventional binder. Note that a conventional additive may be added to the positive-electrode mix.

Then, the gel electrolyte layer 23 is formed on the positive-electrode active material layer 21a of the positive electrode sheet. To form the gel electrolyte layer 23, an electrolyte salt is dissolved in a nonaqueous solvent to prepare a nonaqueous electrolytic solution. The matrix polymer is added to the nonaqueous electrolytic solution, and then the solution is sufficiently stirred so as to dissolve the matrix polymer. Thus, a sol electrolyte solution is prepared.

Then, the electrolyte solution is applied to the surface of the positive-electrode active material layer 21a in a predetermined quantity. Then, the positive-electrode active material layer 21a is cooled at room temperature to gel the matrix polymer. Thus, the gel electrolyte layer 23 is formed on the positive-electrode active material layer 21a.

Then, the positive electrode sheet having the gel electrolyte layer 23 formed thereon is cut to obtain an elongated member. Then, a lead wire constituted by, for example, aluminum, is welded to a portion of the positive electrode collector 21b in which the positive-electrode active material layer 21a is not formed so that the positive-electrode terminal 27 is formed. Thus, an elongated positive electrode 21 having the gel electrolyte layer 23 formed thereon can be obtained.

The negative electrode 22 is prepared as follows: a negative-electrode mix containing a negative-electrode active material and a binder is uniformly applied to a metal foil, such as a copper foil, which is formed into the negative electrode collector 22b. Then, the metal foil is dried so that the negative-electrode active material layer 22a is formed. Thus, a negative electrode sheet is prepared. The binder of the negative-electrode mix may be a conventional binder. Note that a conventional additive may be added to the negative-electrode mix.

Then, the gel electrolyte layer 4 is formed on the negative electrode collector 22b of the negative electrode sheet. To form the gel electrolyte layer 23, an electrolyte solution prepared similarly to the foregoing process is applied to the negative-electrode active material layer in a predetermined quantity. Then, the negative-electrode active material layer is cooled at room temperature so as to gel the matrix polymer. As a result, the gel electrolyte layer 23 is formed on the negative electrode collector 22b.

Then, the negative electrode sheet having the gel electrolyte layer 4 formed thereon is cut to obtain an elongated member. Then, a lead wire constituted by, for example, nickel, is welded to a portion of the negative electrode collector 22b in which the negative-electrode active material layer 22a is not formed so that the negative-electrode terminal 28 is formed. Thus, the elongated negative electrode 3 having the gel electrolyte layer 23 formed thereon can be obtained.

The surfaces of the thus-prepared elongated positive electrode 21 and the negative electrode 22 on each of which the gel electrolyte layer 23 are disposed opposite to each other. Then, the separator 24 is disposed between the positive electrode 21 and the negative electrode 22 so as to be pressed. Thus, an electrode laminate is formed. Then, the electrode laminate is wound in the lengthwise direction so that the wound electrode 25 is formed.

Finally, the wound electrode 25 is sandwiched by the casing film 26 constituted by an insulating material. Then, the resin film 29 is disposed in each of the regions in which the positive-electrode terminal 27 and the negative-electrode terminal 28 overlap the casing film 26. Then, the outer periphery of the casing film 26 is sealed to insert the positive-electrode terminal 27 and the negative-electrode terminal 28 into the sealing portion of the casing film 26. Moreover, the wound electrode 25 is hermetically enclosed in the casing film 26. Thus, the gel electrolyte battery 20 is prepared.

Figure 14:
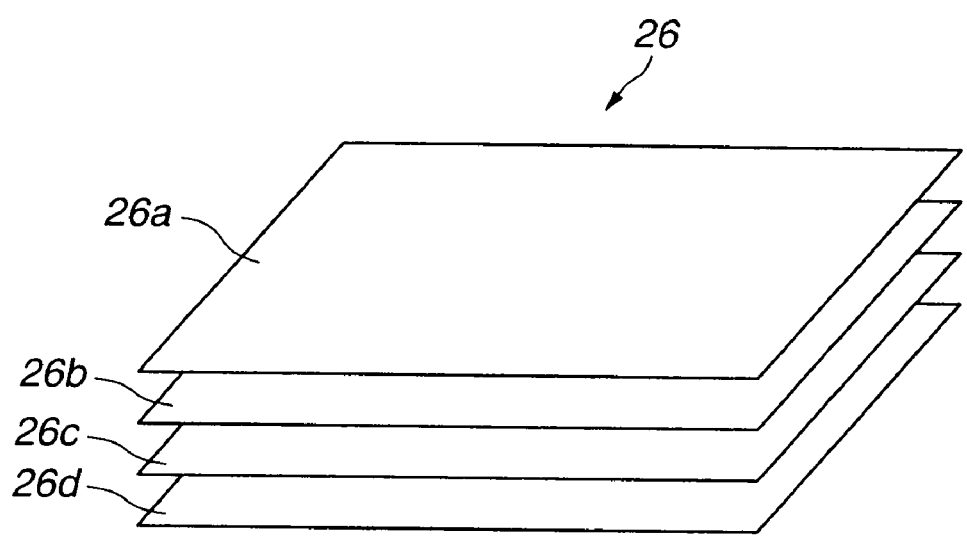
FIG. 14 is a cross sectional view showing an example of the structure of a casing film.

The casing film 26 is formed by sequentially laminating a first polyethylene terephthalate layer 26a, an aluminum layer 26b, a second polyethylene terephthalate layer 26c and a straight-chain and low-density polyethylene layer 26d in this order, as shown in FIG. 14. The straight-chain and low-density polyethylene layer 26d serves as a thermal bonding layer. When the wound electrode 25 is enclosed, the straight-chain and low-density polyethylene layer 26d is disposed on the inside. The thermal bonding layer may be constituted by a material, such as polyethylene terephthalate, nylon, cast polypropylene or high-density polyethylene as well as straight-chain and low-density polyethylene.

Note that the structure of the casing film 26 is not limited to the foregoing structure. The necessity is such that at least one aluminum layer is present in the layer and the thermo-bonding polymer film is present on at least one surface.

When the wound electrode 25 is packed in the casing film 26, the resin film 29 is disposed in each of the regions in which the casing film 26 and the positive-electrode terminal 27 and the negative-electrode terminal 28 are brought into contact with each other. Thus, occurrence of short circuiting caused by burrs of the casing film 26 can be prevented. Moreover, adhesion between the casing film 26 and the positive-electrode terminal 27 and between the casing film 26 and the negative-electrode terminal 28 can be improved.

The material of the resin film 29 must adhere to the positive electrode terminal 17 and the negative electrode terminal 18. When the foregoing requirement is satisfied, the material is not limited. It is preferable that any one of the following materials is employed: polyethylene, polypropylene, denatured polyethylene, denatured polypropylene, their copolymers and polyolefin resin. It is preferable that the thickness of the resin film 29 is from 20 μm to 300 μm realized before the thermal bonding operation is performed. When the thickness of the resin film 29 is less than 20 μm, ease of handling deteriorates. When the thickness is greater than 300 μm, water penetration easily takes place. Thus, the airtightness in the battery cannot easily be maintained.

In the foregoing embodiment, the elongated positive electrode 21 and the elongated negative electrode 22 are laminated. Then, the laminate is wound in the lengthwise direction so that the wound electrode 25 is formed. The present invention is not limited to the foregoing structure. A rectangular positive electrode 21 and a rectangular negative electrode 22 may be laminated to form a wound electrode. Another structure may be employed in which the electrode laminate is alternately folded.

In the foregoing embodiment, the electrolyte to be interposed between the positive electrode 21 and the negative electrode 22 is the gel electrolyte containing the matrix polymer, the electrolyte salt and the solvent. The present invention is not limited to the foregoing structure. The present invention may be applied to a structure in which a solid electrolyte which does not contain solvent is employed and a structure in which an electrolytic solution which does not contain the matrix polymer is employed.

The shape of the gel electrolyte battery 20 according to this embodiment is not limited. For example, a cylindrical shape, a rectangular shape or a coin shape may be employed. Moreover, the size may be a variety of sizes including a thin structure and a large-size structure. The present invention may be applied to both primary batteries and secondary batteries.

EXAMPLES

To confirm the effects of the invention, batteries having the foregoing structures were prepared to evaluate their characteristics.

First Experiment

In Examples 1 to 7 and Comparative Example 1, the separators according to the first embodiment were used to prepare batteries so as to evaluate their characteristics.

Manufacturing of Sample Batteries

Example 1

Initially, the positive electrode was prepared.

Initially, commercially available lithium carbonate and cobalt carbonate were mixed with each other in such a manner that the composition ratio of lithium atoms and cobalt atoms was 1:1. Then, the mixture was baked for five hours in air at 900° C. Thus, cobalt acid lithium serving as the positive-electrode active material was obtained. The mean particle size of the cobalt acid lithium was 10 μm.

Then, 91 parts by weight of the obtained positive-electrode active material, 6 parts by weight of graphite serving as a conductive material and 3 parts by weight of polyvinylidene fluoride serving as the binder were mixed with one another so that a positive-electrode mix was prepared. Then, the positive-electrode mix was dispersed in N-methyl-2-pyrolidone so as to be formed into a paste.

Then, the obtained positive-electrode mix paste was uniformly applied to the two sides of an elongated aluminum foil serving as the positive electrode collector and having a thickness of 20 μm. Then, the aluminum foil was subjected to a drying process. After the drying process was completed, a roller press was operated to compress and mold the aluminum foil. Thus, a positive-electrode active material layer having a thickness of 40 μm was formed. Then, a lead wire constituted by aluminum was welded to a portion of the positive electrode collector in which the positive-electrode active material layer was not formed. Thus, a positive electrode terminal was formed. As a result, the positive electrode was prepared. The density of the positive-electrode active material layer was 3.6 g/cm$^3$.

Then, the negative electrode was prepared as follows.

Initially, methocarbon microbeads having a mean particle size of 25 μm were baked at 2800° C. so that graphite serving as the negative-electrode active material was obtained.

Then, 90 parts by weight of the obtained negative-electrode active material and 10 parts by weight of polyvinylidene fluoride were mixed so that a negative-electrode mix was prepared. Then, the negative-electrode mix was dispersed in N-methyl-2-pyrolidone serving as the solvent so as to be formed into a paste.

Then, the obtained negative-electrode mix paste was uniformly applied to the two sides of an elongated copper foil serving as the negative electrode collector and having a thickness of 15 μm. Then, a drying process was performed. After the elongated copper foil had been dried, a roller press was operated to perform a compression molding operation. Thus, a negative-electrode active material layer having a thickness of 55 μm was formed. Then, a nickel lead wire was welded to a portion of the negative electrode collector in which the negative-electrode active material layer was not formed so that a positive electrode terminal was formed. The density of the negative-electrode active material layer was 1.6 g/cm$^3$ at this time.

Then, a gel electrolyte layer was formed on each of the positive electrode and the negative electrode.

Initially, 80 g of dimethyl carbonate, 40 g of ethylene carbonate, 40 g of propylene carbonate, 9.2 g of LIPF$_6$, 0.8 g of vinylene carbonate and 0.8 g of 2,4-difluoroanisol were mixed with each other so that a solution was prepared. Then, the solution was added to 10 g of a copolymer (copolymerization weight ratio PVdF:HFP=97:3) of polyvinylidene fluoride (PVdF) and hexafluoropolypropylene (HFP). Then, a homogenizer was used to prepare a uniform dispersion. Then, heating and stirring were performed at 75° C. until a colorless and transparent state was realized. Thus, the electrolyte solution was prepared.

Then, the obtained electrolyte solution was uniformly applied to the two sides of each of the positive electrode and the negative electrode by the doctor blade method. Then, the positive electrode and the negative electrode applied with the electrolyte solution were allowed to stand in a drying unit, the inside portion of which was maintained at 40° C., for one minute. Thus, the electrolyte solution was gelled so that a gel electrolyte layer having a thickness of about 8 μm was formed on each of the two sides of each of the positive electrode and the negative electrode.

Then, the battery was assembled as follows.

Initially, the thus-prepared elongated positive electrode incorporating the gel electrolyte layer formed on each of the two sides thereof and the elongated negative electrode incorporating the gel electrolyte layer formed on each of the two sides thereof were laminated through a separator so that a laminate was obtained. Then, the laminate was wound in its lengthwise direction so that a wound electrode was obtained. The separator was a porous polyethylene film having a volume porosity of 36% and a thickness of 8 μm.

The wound electrode was sandwiched by a moisture-proof casing film formed by laminating a nylon sheet having a thickness of 25 μm, an aluminum sheet having a thickness of 40 μm and a polypropylene sheet having a thickness of 30 μm. Then, the outer periphery of the casing film was bonded with heat under reduced pressure so as to be sealed. Thus, the wound electrode was hermetically enclosed in the casing film. At this time, the positive electrode terminal and the negative electrode terminal were sandwiched in the sealing regions of the casing film. Moreover, a polyolefin film was disposed in each of the regions in which the casing film and the positive electrode terminal and the negative electrode terminal were in contact with each other.

Finally, the electrode elements were subjected to heat treatment in a state where the electrode terminals were enclosed in the casing film. Thus, the gel electrolyte battery was prepared.

Example 2

A process similar to that according to Example 1 was performed except for the separator which was, in this example, a porous polyethylene film having a volume porosity of 37% and a thickness of 9 μm. Thus, a gel electrolyte battery was prepared.

Example 3

A process similar to that according to Example 1 was performed except for the separator which was, in this example, a porous polyethylene film having a volume porosity of 35% and a thickness of 10 µm. Thus, a gel electrolyte battery was prepared.

Example 4

A process similar to that according to Example 1 was performed except for the separator which was, in this example, a porous polyethylene film having a volume porosity of 30% and a thickness of 12 µm. Thus, a gel electrolyte battery was prepared.

Example 5

A process similar to that according to Example 1 was performed except for the separator which was, in this example, a porous polyethylene film having a volume porosity of 39% and a thickness of 15 µm. Thus, a gel electrolyte battery was prepared.

Example 6

A process similar to that according to Example 1 was performed except for the separator which was, in this example, a porous polyethylene film having a volume porosity of 36% and a thickness of 8 µm. Thus, a gel electrolyte battery was prepared.

Example 7

A process similar to that according to Example 1 was performed except for the separator which was, in this example, a porous polyethylene film having a volume porosity of 36% and a thickness of 16 µm. Thus, a gel electrolyte battery was prepared.

Comparative Example 1

A process similar to that according to Example 1 was performed except for omission of the separator in this comparative example. Thus, a gel electrolyte battery was prepared.

Evaluation of Characteristics of Sample Batteries

The materials, volume porosities, thicknesses, breaking strength and breaking ductility of the separators according to Examples 1 to 7 are collectively shown in Table 1.

TABLE 1

|  | Material | Vacancy Ratio (%) | Thickness | Breaking Strength (kg/cm$^2$) | Breaking Ductility (%) |
|---|---|---|---|---|---|
| Example 1 | polyethylene | 36 | 8 | 739 | 161 |
| Example 2 | polyethylene | 37 | 9 | 1185 | 156 |
| Example 3 | polyethylene | 35 | 10 | 1300 | 164 |
| Example 4 | polyethylene | 30 | 12 | 1409 | 170 |
| Example 5 | polyethylene | 39 | 15 | 1179 | 137 |
| Example 6 | polypropylene | 36 | 8 | 1650 | 139 |
| Example 7 | polypropylene | 36 | 16 | 1946 | 127 |

Evaluation of Charge and Discharge Characteristics

The thus-prepared batteries were subjected to charge and discharge tests so that the characteristics of the batteries were evaluated. A potentio-galvanostat was operated to perform the charge and discharge tests of the batteries. A constant-current and constant-voltage method was employed to perform the charge and discharge.

Initially, each battery was charged with a constant current of 200 mA. When the voltage of the closed circuit was raised to 4.2 V, the constant-current charge was changed to the constant-voltage charge. Then, the constant-voltage charge was continued. The charge was completed nine hours after start of the charging operation. Then, discharge was performed with a constant current of 200 mA. When the voltage of the closed circuit was raised to 3.0 V, the discharge was completed.

The charge and discharge capacities of each battery were detected. Moreover, a charge and discharge efficiency and an energy density of each battery were calculated.

The detected charge capacity, the discharge capacity, the charge and discharge efficiency and the energy density of each of the batteries according to Examples 1 to 7 and Comparative Example 1 are shown in Table 2.

TABLE 2

|  | Initial Charge Capacity (mAh/g) | Initial Discharge Capacity (mAh/g) | Charge and Discharge Efficiency (%) | Energy Density (Wh/l) |
|---|---|---|---|---|
| Example 1 | 710 | 611 | 86 | 332 |
| Example 2 | 709 | 608 | 86 | 331 |
| Example 3 | 711 | 606 | 85 | 330 |
| Example 4 | 708 | 609 | 86 | 331 |
| Example 5 | 710 | 606 | 85 | 330 |
| Example 6 | 497 | 352 | 71 | 189 |
| Example 7 | 512 | 355 | 69 | 191 |
| Comparative Example 1 | 1503 | 349 | 23 | 187 |

As can be understood from Table 2, the batteries according to Examples 1 to 7 were excellent in all of the charge capacity, the discharge capacity, the charge and discharge efficiency and the energy density. Thus, the desired excellent characteristics were realized. In particular, the batteries each incorporating the polyethylene separator and according to Examples 1 to 5 were excellent in the characteristics.

On the other hand, the battery according to Comparative Example 1 encountered small short circuit during the charging operation. That is, satisfactory battery characteristics were not obtained.

Evaluation of Safety of Sample Batteries

The shutdown start temperature of the separator of each of the batteries according to Examples 1 to 7 and Comparative Example 1 and the highest surface temperature of each battery when the battery was externally short-circuited were examined.

The shutdown temperature was measured such that the battery was heated at a rising ratio of 5° C./minute. When the AC resistance was raised by 10° C. or more owing to application of 1 kHz, the temperature of each battery was measured.

The temperature of the surface of the battery realized when the battery was externally short-circuited was measured such that the battery was charged under similar conditions to those for the charge and discharge tests. Then, the battery was heated to 60° C. In the foregoing state, the highest temperature of the battery realized when the terminals were short-circuited by using a 12 mΩ resistor was measured by using a thermo-couple.

The shutdown temperature and the temperature of the surface of each of the batteries according to Examples 1 to 7 and Comparative Example 1 realized when external short circuiting was caused to occur are shown in Table 3.

TABLE 3

| | Shutdown Start Temperature (° C.) | Temperature of Surface of Battery when External Short Circuit was Caused to Occur (° C.) |
|---|---|---|
| Example 1 | 126 | 118 |
| Example 2 | 126 | 119 |
| Example 3 | 125 | 117 |
| Example 4 | 126 | 118 |
| Example 5 | 123 | 116 |
| Example 6 | 163 | 161 |
| Example 7 | 165 | 165 |
| Comparative Example 1 | — | 200 or higher |

Figure 15:
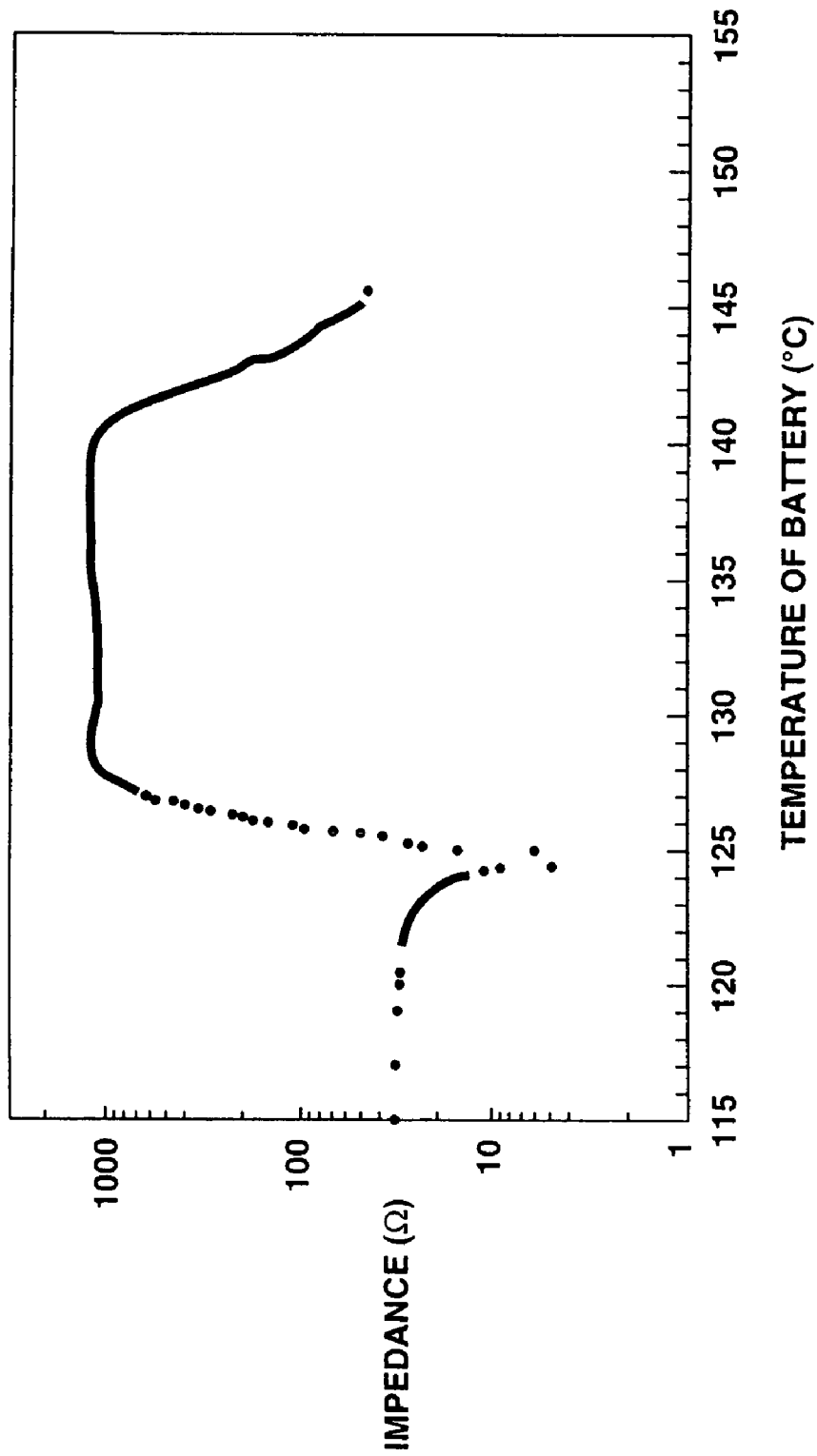
FIG. 15 is a graph showing the relationship between the temperature of the battery according to Example 1 and the internal impedance of the same.

As can be understood from Table 3, each of the batteries according to Examples 1 to 5 and incorporating the separator constituted by polyethylene encountered shutdown in a temperature range from 100° C. to 160° C. The relationship between the temperature of the battery according to Example 1 and the impedance in the battery was shown in FIG. 15. As can be understood from FIG. 15, the impedance in the battery was rapidly increased when the temperature of the battery was about 126° C.

Figure 16:
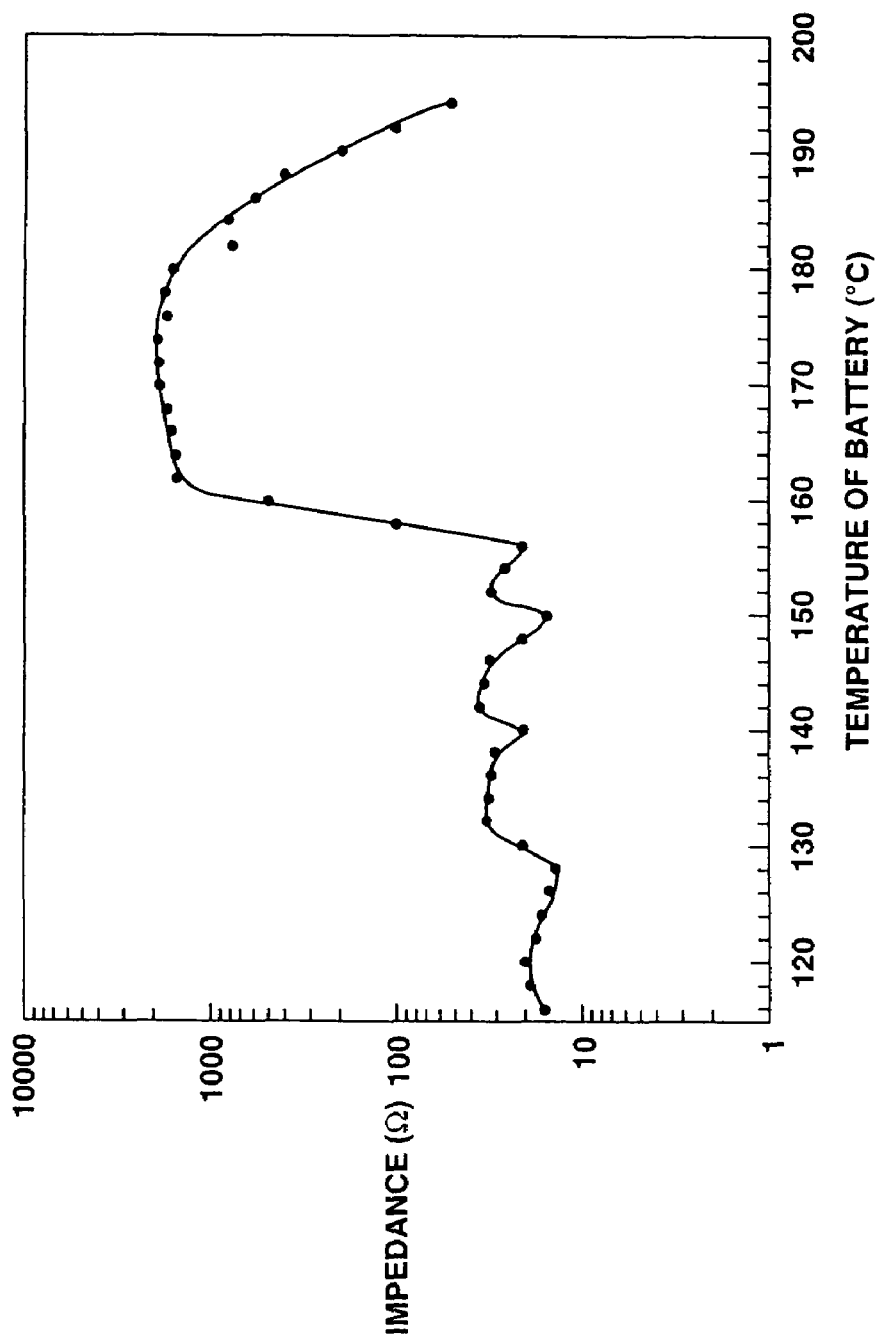
FIG. 16 is a graph showing the relationship between the temperature of the battery according to Example 6 and the internal impedance of the same.

The batteries according to Examples 6 and 7 and each incorporating the separator constituted by polypropylene encountered shutdown in spite of the temperature being 160° C. or greater. The relationship between the temperature of the battery according to Example 6 and the impedance in the battery was shown in FIG. 16. As can be understood from FIG. 16, the impedance in the battery was rapidly increased when the temperature of the battery was about 163° C.

The temperature of the surface of each of the batteries according to Examples 1 to 5 when the charged battery was externally short-circuited was 120° C. or less. Thus, heat generation occurring when the battery is erroneously operated was effectively prevented. Hence it follows that the safety of the battery was secured. On the other hand, the temperature of the surface of each of the batteries according to Examples 6 and 7 was raised to 160° C. when the charged battery was externally short-circuited. Thus, great heat generation occurs when the battery is used erroneously. The batteries according to Examples 1 to 7 encountered the shutdown effect were free from any smoke from the inside portion of the battery when the charged battery was externally short-circuited.

On the other hand, the battery according to Comparative Example 1 was free from any shutdown effect when the temperature of the battery was raised to 180° C. When the charged battery was externally short-circuited, the temperature of the surface of the battery was raised to 200° C. Moreover, smoke from the inside portion of the battery occurred.

Specification of Physical Properties of Separator

Figure 17:
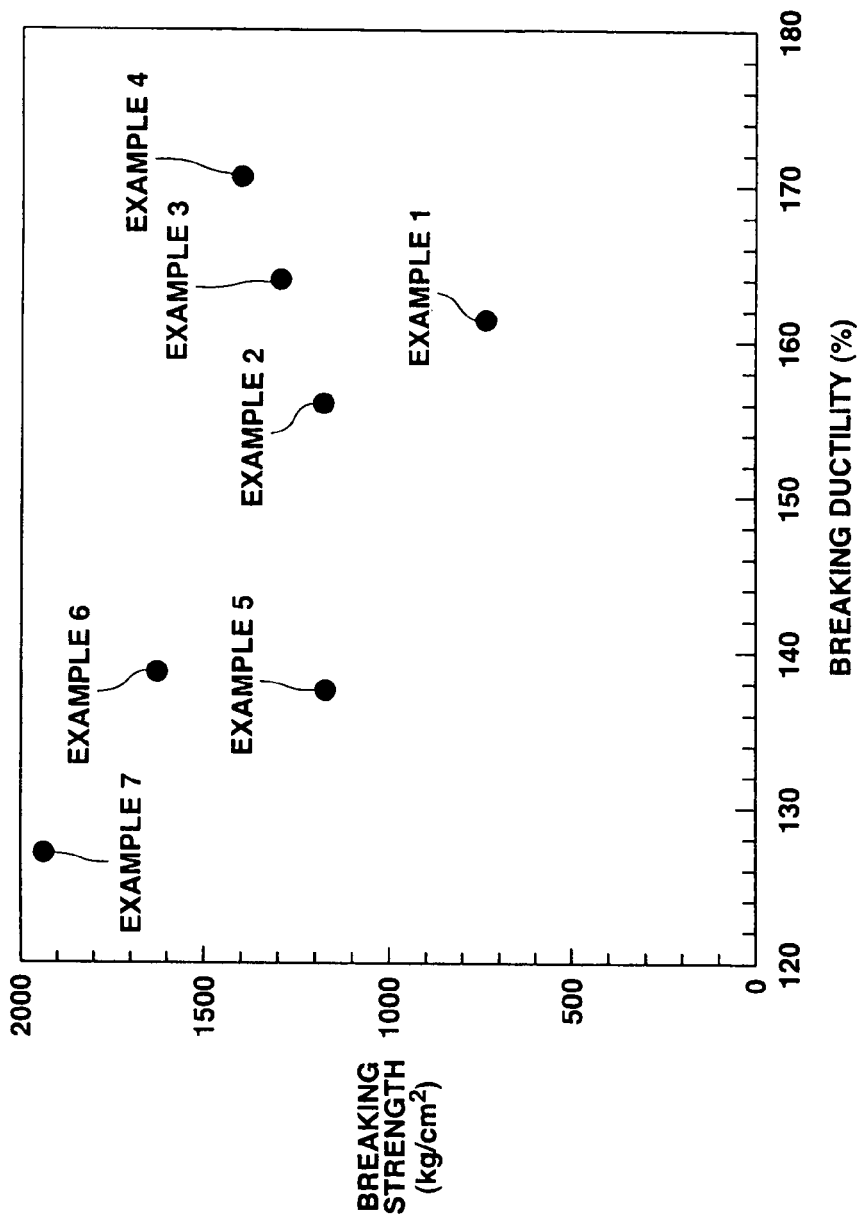
FIG. 17 is a graph showing the relationship between the breaking strength and the breaking ductility of each of the separators of the batteries according to Examples 1 to 7.

The relationship between the breaking strength and the breaking ductility of the separator of each of the batteries according to Examples 1 to 7 is shown in FIG. 17. As can be understood from FIG. 17 and the results of the evaluation of the characteristics of the battery, the breaking strength of the separator of each of the batteries according to Examples 1 to 5 and from which excellent characteristics of the battery were obtained was less than 1650 kg/cm². Moreover, the breaking ductility was 135% or greater. The foregoing mechanical strength was realized.

Figure 18:
FIG. 18 is a photograph showing the fibril structure of the separator of the battery according to Example 6.

All of the separators each having the foregoing mechanical strength had the fibril structure shown in FIG. 6. An electronic microscope photograph of the fine structure of the separator according to Example 6 at a magnification of 50,000 times is shown in FIG. 18. When a comparison between FIGS. 6 and 18 was made, it can be understood that the mechanical strength of the separator relates to its fine structure. To realize the foregoing mechanical strength, the fine structure of the separator must be the fibril structure.

As a result, use of the porous polyolefin separator having a thickness not less than 5 μm nor greater than 15 μm, a volume porosity not less than 25% nor greater than 60% and a shutdown effect when the temperature of the battery is from 100° C. or greater to 160° C. or less enabled both of a high energy density and safety of the battery to be realized.

It can also be understood that use of the porous polyolefin film having a thickness not less than 5 μm nor greater than 15 μm, a volume porosity not less than 25% nor greater than 60%, a breaking strength less than 1650 kg/cm² and a breaking ductility not less than 135% enabled both a high energy density and safety of the battery to be realized.

Second Experiment

In each of the following Examples 8 and 9 and Comparative Example 2, the separator according to the second embodiment was employed to prepare batteries to evaluate their characteristics.

Example 8

The positive electrode was prepared such that 95 wt % of $LiCoO_2$ serving as the positive-electrode active material, 2 wt % of graphite serving as a conductive material and 3 wt % of polyvinylidene fluoride were mixed with one another. Thus, a positive-electrode mix was prepared. Then, N-methyl pyrolidone was added in a quantity which was 0.6 times the quantity of the positive-electrode mix so that a paste was prepared.

Then, the obtained paste was uniformly applied to either side of the aluminum foil which was formed into the positive electrode collector by the doctor blade method. Then, the aluminum foil was dried at high temperatures to remove N-methyl pyrolidone. Thus, a positive-electrode active material layer was formed. Finally, a roll press was operated to apply sufficient polyethylene to perform a pressing operation. Then, the sample was cut to a size 300 mm×50 mm so that the positive electrode was prepared. An aluminum wire was spot-welded to the positive electrode so that a positive electrode terminal was formed.

To prepare the negative electrode, 91 wt % of graphite serving as the negative-electrode active material and 9 wt % of polyvinylidene fluoride serving as the binder were mixed with each other so that the negative-electrode mix was prepared. Then, N-methyl pyrolidone was added in a quantity which was 1.1 times the quantity of the negative-electrode mix so that a paste was prepared.

Then, the obtained paste was uniformly applied to either side of the copper foil which was formed into the negative electrode collector by the doctor blade method. Then, the copper foil was dried to remove N-methyl pyrolidone so that the negative-electrode active material layer was formed. Finally, the roll press was operated to apply sufficient polyethylene to perform a pressing operation. Then, the sample was cut to a size 370 mm×52 mm so that the negative electrode was prepared. Then, a copper wire was spot-welded to the negative electrode so that the negative electrode terminal was formed.

On the other hand, 6.7 wt % of polyvinylidene fluoride, 9.2 wt % of ethylene carbonate, 11.6 wt % of propylene carbonate, 2.3 wt % of γ-butylolactone, 6.67 wt % of dimethyl carbonate and 3.5 wt % of $LiPF_6$ were mixed with one another. Thus, a polymer electrolyte solution was prepared. Note that dimethyl carbonate served as solvent for dissolving polyvinylidene fluoride.

The obtained polymer electrolyte solution was applied to the surface of each of the positive electrode and the negative electrode by the doctor blade method. Then, the positive electrode and the negative electrode were dried for three minutes in a constant-temperature tank set to 35° C. Thus, a thin film was formed. At this time, dimethyl carbonate was not left in the polymer electrolyte. The application operation was performed in such a manner that the thickness of the polymer electrolyte on each of the positive electrode and the negative electrode was 10 μm.

The separator was a separator constituted by a composite material of polyethylene and polypropylene and having a thickness of 10 μm. The ratio of polyethylene and polypropylene in the composite material was 1:1. The separator constituted by the composite material was prepared as follows.

Initially, 100 parts by weight of a polyolefin mixture composed of 20 wt % of ultra high molecular weight polyethylene (UHMWPE) having a weight average molecular weight (Mw) of $2.5 \times 10^6$, 30 wt % of high-density polyethylene (HDPE) having a weight average molecular weight (Mw) of $3.5 \times 10^5$ and 50 wt % of polypropylene having a weight average molecular weight (Mw) of $5.1 \times 10^5$ was added with 0.375 part by weight of a oxidation inhibitor so that a polyolefin composition was prepared.

Then, 30 parts by weight of the polyolefin composition were introduced into a biaxial the extruder (having a diameter of 58 mm, L/D=42 and a strong kneading type). Moreover, 70 parts by weight of liquid paraffin were supplied through a side feeder of the biaxial extruder so as to be melted and kneaded at 200 rpm. Thus, a polyolefin solution was prepared in the extruder.

Then, the polyolefin solution was extruded from a T-die disposed at the leading end of the extruder at 190° C. so as to be wound around a cooling roll. Thus, a gel sheet was molded. The, the gel sheet was simultaneously double-axis oriented at 115° C. to obtain a 5×5 oriented film. The obtained oriented film was cleaned with methylene chloride to extract and remove liquid paraffin. Then, the oriented film was dried and subjected to heat treatment. Thus, a fine-porous separator constituted by a composite material of polyethylene and polypropylene was obtained.

The thus-prepared elongated positive electrode having the gel electrolyte layer and the elongated negative electrode having the gel electrolyte layer were laminated through the separator so that a laminate was formed. Then, the laminate was wound in its lengthwise direction. Thus, a 36 mm×52 mm×5 mm wound electrode was obtained.

Then, the wound electrode was sandwiched by a casing film constituted by a moisture-proof multilayered film having a thickness of 100 μm. Then, the outer periphery of the casing film was heat-bonded under reduced pressure so as to be sealed. Thus, the wound electrode was hermetically sealed in the casing film. At this time, the positive electrode terminal and the negative electrode terminal were sandwiched in the sealing portions of the casing film.

Example 9

A process similar to that according to Example 8 was performed except for a separator which was, in this example, obtained by bonding a polyethylene separator having a thickness of 5 μm and a polypropylene separator having a thickness of 5 μm to each other. Thus, a battery was prepared.

Comparative Example 2

A process similar to that according to Example 8 was performed except for a separator which was, in this example, a polyethylene separator having a thickness of 10 μm. Thus, a battery was prepared.

Each of the thus-prepared batteries were charged and discharged several times. In a discharged state, the battery was introduced into a constant-temperature tank. While measuring the resistance with 1 kHz, the temperature was raised to 140° C., 140° C., 150° C., 155° C., 160° C., 165° C. and 170° C. at a rising rate of 5° C./minute. Then, each temperature was maintained for 30 minutes. When the resistance was not decreased in the period in which the predetermined temperature was maintained, a determination was made that no short circuiting occurred. When the resistance was decreased, a determination was made that short circuiting occurred.

Results are shown in Table 4.

TABLE 4

|  | Example 8 | Example 9 | Comparative Example 2 |
|---|---|---|---|
| 140° C. | ○ | ○ | ○ |
| 145° C. | ○ | ○ | ○ |
| 150° C. | ○ | ○ | X |
| 155° C. | ○ | ○ | X |
| 160° C. | ○ | ○ | X |
| 165° C. | ○ | ○ | X |
| 170° C. | X | X | X |

The batteries according to Examples 8 and 9 incorporated the separator constituted by the composite material of polyethylene and polypropylene and the separator constituted by bonding the polyethylene separator and the polypropylene separator to each other. As compared with the battery according to Comparative Example 2 and incorporating the separator constituted by only polyethylene, the melt-down temperature was raised by about 15° C. The battery incorporating the separator having the high melt-down temperature enabled the temperature at which the internal short circuiting started owing to the meltdown to be raised. Therefore, when the temperature of the battery was raised, occurrence of the internal short circuiting can be prevented as compared with the polyethylene separator. Thus, prevention of heat generation from the battery caused from the internal short circuiting was permitted.

The prepared battery was charged and discharged several times. Then, the battery in an overcharged state of 4.4 V was introduced into a high-temperature tank. While measuring the resistance with 1 kHz, the temperature was raised to 135° C., 140° C., 145° C., 150° C. and 155° C. at a rising ratio of 5° C./minute. Each temperature was maintained for 30 minutes. When the resistance was not decreased during retention at the predetermined temperature, a determination was made that no short circuiting occurred. When the resistance was decreased, a determination was made that short circuiting occurred. Since the voltage was 4.4 V or greater in the foregoing case, heat was sometimes generated owing to short circuiting. Therefore, the measurement was completed and it was that the resistance was decreased.

Results were shown in Table 5.

TABLE 5

|  | Example 8 | Example 9 | Comparative Example 2 |
|---|---|---|---|
| 135° C. | ○ | ○ | ○ |
| 140° C. | ○ | ○ | X |
| 145° C. | ○ | ○ | X |
| 150° C. | X | ○ | X |
| 155° C. | X | X | X |

Even in an abnormal state of overcharging at 4.4 V, the batteries according to Example 8 and Example 9 which incorporated the separator constituted by the composite material of polyethylene and polypropylene and the separator constituted by bonding the polyethylene separator and the polypropylene separator to each other enabled the melt-down temperature to be raised by about 15° C. as compared with the battery according to Comparative Example 2. The battery according to Comparative Example 2 incorporated the separator constituted by only polyethylene. The battery incorporated the separator having the high melt-down temperature enabled the temperature at which the internal short circuit started owing to meltdown to be raised. When the temperature of the battery was raised, short circuiting did not easily occur as compared with the polyethylene separator. Thus, heat generation of the battery owing to the internal short circuit can be prevented.

In the present invention, the separator constituted by the porous polyolefin film, the separator constituted by the composite material of polyethylene and polypropylene or the separator formed by bonding the first separator constituted by polyethylene and the second separator constituted by the polypropylene, the mechanical characteristics and thermal characteristics of which are specified are employed. Therefore, both raising of the energy density and improvement in the safety can be realized as distinct from the conventional technique. Thus, a high-performance solid electrolyte battery having excellent characteristics and safety can be realized.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

The invention claimed is:

1. A gel electrolyte battery comprising:
    a positive electrode;
    a negative electrode disposed opposite to said positive electrode;
    a separator disposed between said positive electrode and said negative electrode; and
    gel electrolytes each of which is disposed between said positive electrode and said separator and between said separator and said negative electrode;
    wherein said separator comprises a mixture of polyethylene and polypropylene, said separator has a thickness satisfying a range not less than 5 μm nor greater than 15 μm, the shutdown temperature of said separator is substantially the same as the shutdown temperature of a separator constituted by polyethylene and the meltdown temperature of said separator is greater than the meltdown temperature of a separator constituted by polyethylene by a range satisfying a range not less than 10° C. nor greater than 30° C.
    wherein the thickness of the gel electrolytes are not less than 5 μm nor greater than 19 μm.

2. The gel electrolyte battery according to claim 1, wherein said gel electrolytes contain a swelling solvent.

3. The gel electrolyte battery according to claim 1, wherein said electrodes consist of a positive electrode using lithium ions as electrode reaction species and a negative electrode constituted by a carbonaceous material.

4. The gel electrolyte battery according to claim 2, wherein said gel electrolytes contain ethylene carbonate, propylene carbonate and $LiPF_6$.

5. The gel electrolyte battery according to claim 4, wherein said gel electrolytes contain vinylene carbonate and/or 2,4-difluoroanisol.

6. The gel electrolyte battery according to claim 5, wherein the content of each of vinylene carbonate and 2,4-difluoroanisol is not greater than 5 wt % of the overall weight of said gel electrolytes.

7. The gel electrolyte battery according to claim 6, wherein Said gel electrolytes are employed which is constituted by polyvinylidene fluoride or a copolymer of polyvinylidene fluoride.

8. The gel electrolyte battery according to claim 7, wherein a copolymer is used which contains polyvinylidene fluoride and hexafluoropolypropylene.

9. The gel electrolyte battery according to claim 8, wherein said gel electrolytes are composed of a copolymer constituted by polyvinylidene fluoride and hexafluoropolypropylene such that hexafluoropolypropylene is contained in a quantity greater than 8 wt %

10. The gel electrolyte battery according to claim 7, wherein the separator comprises a polyolefin mixture of 50% wt. polyethylene and 50% wt. polypropylene.

11. The gel electrolyte battery according to claim 7, wherein the polyethylene comprises at least two types of polyethylene of different average molecular weight.

12. The gel electrolyte battery according to claim 11, wherein the polyethylene comprises an ultra-high molecular weight polyethylene and a high-density polyethylene.

13. The gel electrolyte battery according to claim 12, wherein the ultra-high molecular weight polyethylene has an average molecular weight of $2.5 \times 10^6$ and the high-density polyethylene has an average molecular weight of $3.5 \times 10^5$.

14. The gel electrolyte battery according to claim 10, wherein the separator comprises a polyolefin mixture of 20% wt. ultra-high molecular weight polyethylene, 30% wt. high-density polyethylene, and 50% wt. polypropylene.

* * * * *